US012632563B2

(12) United States Patent
McNally et al.

(10) Patent No.: US 12,632,563 B2
(45) Date of Patent: May 19, 2026

(54) FACILITATING MODIFICATION OF COMPONENTS OF ARTIFICIAL INTELLIGENCE COMPUTING APPLICATIONS VIA AGGREGATED RISK SCORES

(71) Applicant: OneTrust LLC, Atlanta, GA (US)

(72) Inventors: Laurence McNally, Atlanta, GA (US); Shane Wiggins, Atlanta, GA (US); Kevin Jones, Atlanta, GA (US); Andrew Clearwater, Brunswick, ME (US); Blake Brannon, Smyrna, GA (US)

(73) Assignee: One Trust LLC, Atlanta, GA (US)

( * ) Notice: Subject to any disclaimer, the term of this patent is extended or adjusted under 35 U.S.C. 154(b) by 203 days.

(21) Appl. No.: 18/519,270

(22) Filed: Nov. 27, 2023

(65) Prior Publication Data

US 2025/0173441 A1 May 29, 2025

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 10,032,039 B1 * | 7/2018 | Milman | ............. | G06F 21/6209 |
| 10,592,837 B2 * | 3/2020 | Sinha | ....................... | G06F 21/55 |
| 2021/0027136 A1 * | 1/2021 | Hwang | ................... | G06F 9/542 |
| 2022/0067160 A1 * | 3/2022 | Mammadli | ............. | G06F 16/21 |
| 2022/0245539 A1 * | 8/2022 | Clearwater | ........ | G06Q 10/0635 |
| 2022/0309416 A1 * | 9/2022 | Barday | ............... | G06Q 10/067 |
| 2024/0193268 A1 * | 6/2024 | Dzeparoska | .......... | G06F 21/554 |
| 2025/0139629 A1 * | 5/2025 | Datta | ..................... | G06N 20/00 |

* cited by examiner

*Primary Examiner* — Meng Li
(74) *Attorney, Agent, or Firm* — Ballard Spahr LLP

(57) ABSTRACT

Methods, systems, and non-transitory computer readable storage media are disclosed for facilitating modification of components of artificial intelligence computing applications via aggregated risk scores of individual artificial intelligence computing application components. The disclosed system generates data objects representing the artificial intelligence computing application components. The disclosed system determines mappings between the data objects based on relationships of the artificial intelligence computing application components. Furthermore, the disclosed system generates risk scores for the data objects representing the components of the artificial intelligence computing application by administering risk assessments that correspond to a system requirements framework. The disclosed system also generates an interactive aggregated risk indicator indicating contributions of the components to the artificial intelligence computing application in relation to the system requirements framework by combining the risk scores of the data objects according to the mappings between the data objects.

20 Claims, 17 Drawing Sheets

100

Figure 7:
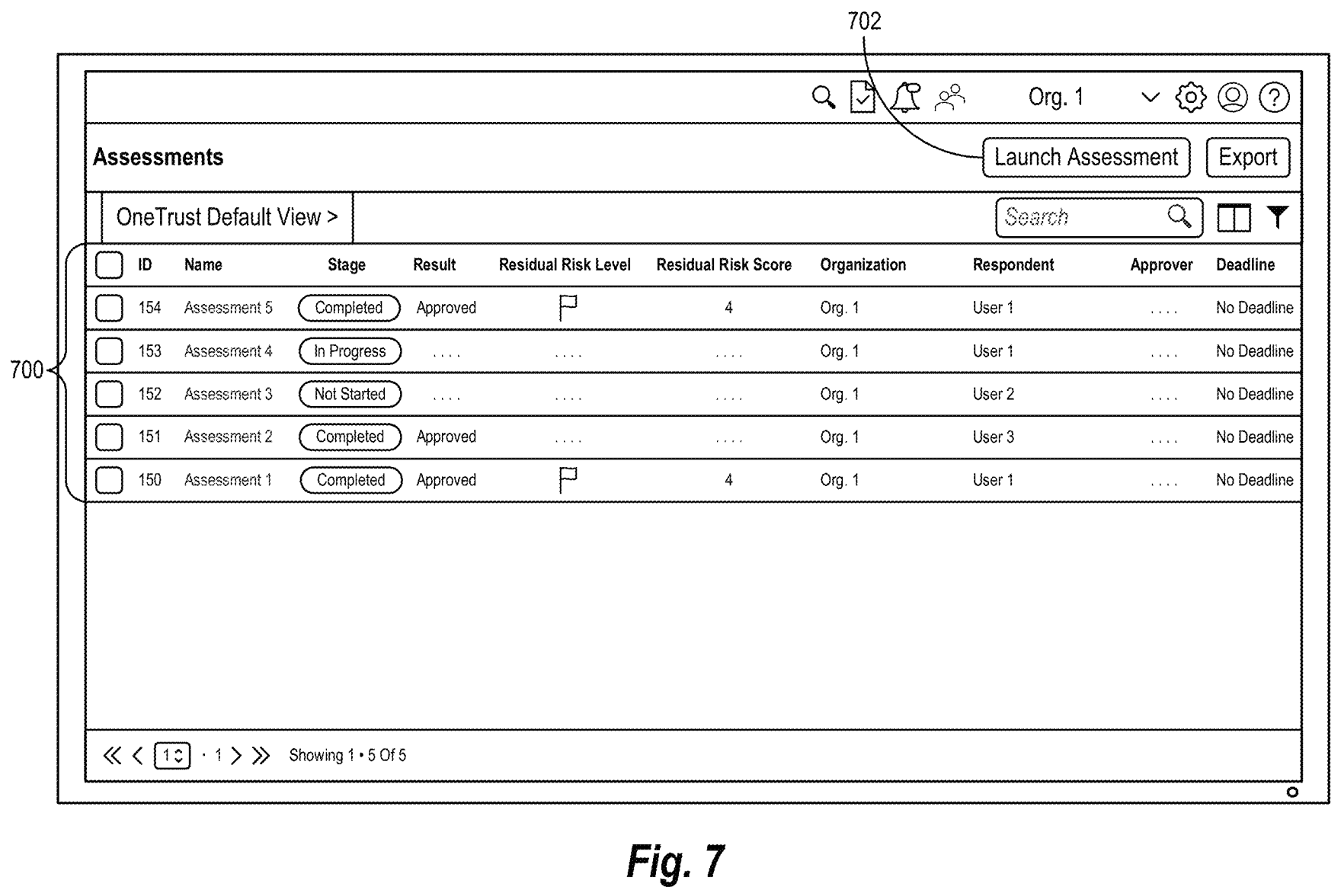

Assessments

OneTrust Default View >

Org. 1 ∨

Launch Assessment    Export

Search

| ID | Name | Stage | Result | Residual Risk Level | Residual Risk Score | Organization | Respondent | Approver | Deadline |
|----|------|-------|--------|---------------------|---------------------|--------------|------------|----------|----------|
| 154 | Assessment 5 | Completed | Approved | ⊏ | 4 | Org. 1 | User 1 | ... | No Deadline |
| 153 | Assessment 4 | In Progress | ... | ... | ... | Org. 1 | User 1 | ... | No Deadline |
| 152 | Assessment 3 | Not Started | ... | ... | ... | Org. 1 | User 2 | ... | No Deadline |
| 151 | Assessment 2 | Completed | Approved | ... | ... | Org. 1 | User 3 | ... | No Deadline |
| 150 | Assessment 1 | Completed | Approved | ⊏ | 4 | Org. 1 | User 1 | ... | No Deadline |

≪ < · 1 · > ≫    Showing 1 · 5 Of 5

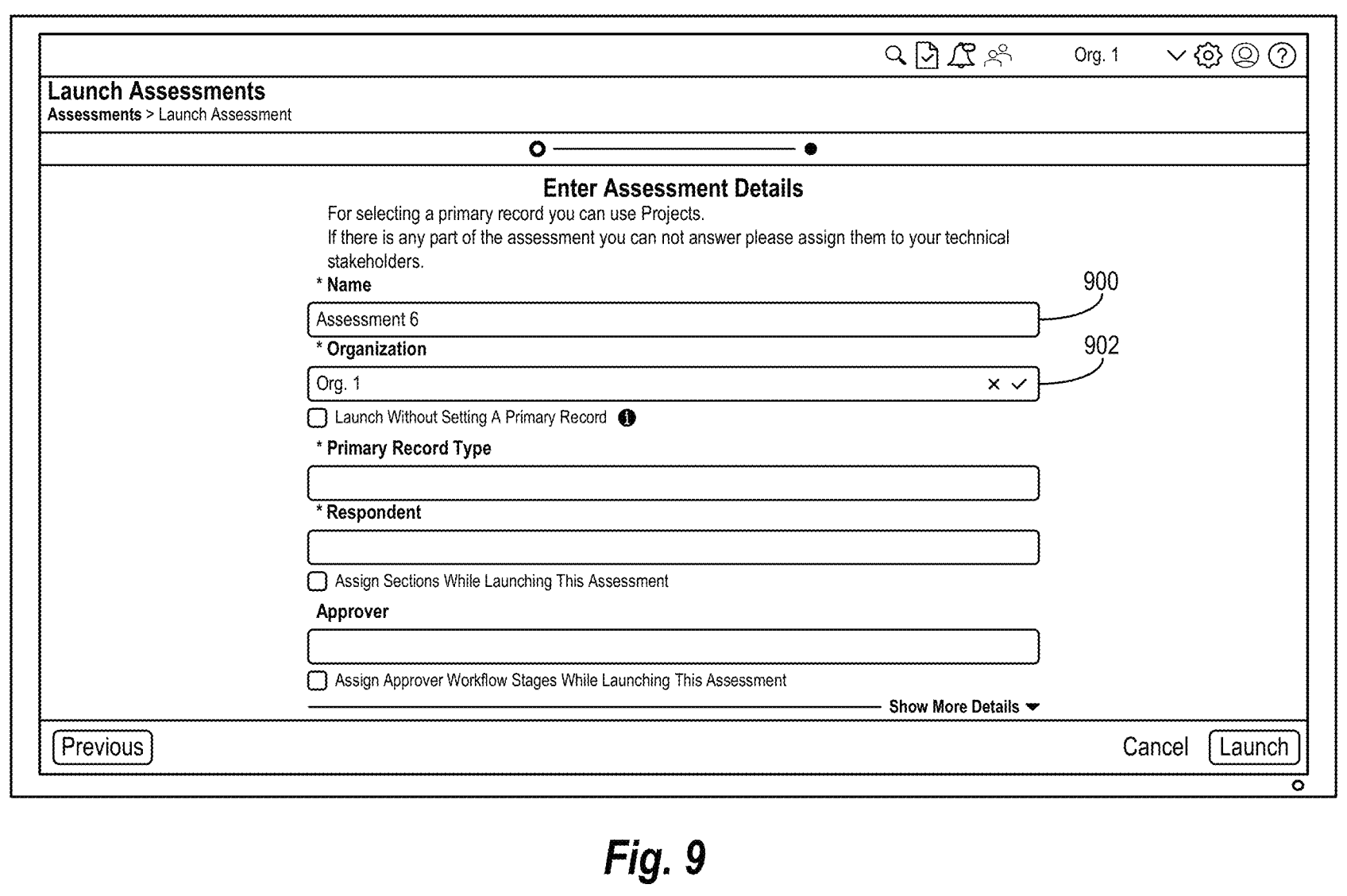

Launch Assessments
Assessments > Launch Assessment

Org. 1        ∨   ⚙   ◎   ⑦

Enter Assessment Details

For selecting a primary record you can use Projects.
If there is any part of the assessment you can not answer please assign them to your technical stakeholders.

**\* Name**

Assessment 6

**\* Organization**

Org. 1                                                        × ∨

☐ Launch Without Setting A Primary Record ⓘ

**\* Primary Record Type**

**\* Respondent**

☐ Assign Sections While Launching This Assessment

Approver

☐ Assign Approver Workflow Stages While Launching This Assessment

—————————————— Show More Details ▶

900
902

Previous                                                Cancel   Launch

*Fig. 9*

Assessments

OneTrust Default View >

| ID | Name | Stage | Result | Residual Risk Level | Residual Risk Score | Organization | Respondent | Approver | Deadline |
|---|---|---|---|---|---|---|---|---|---|
| 155 | Assessment 6 | Under Review | ..... | ■ | 5 | Org. 1 | User 1 | ..... | No Deadline |
| 154 | Assessment 5 | In Progress | Approved | ⌐ | 4 | Org. 1 | User 1 | ..... | No Deadline |
| 153 | Assessment 4 | Not Started | ..... | ..... | ..... | Org. 1 | User 1 | ..... | No Deadline |
| 152 | Assessment 3 | Completed | ..... | ..... | ..... | Org. 1 | User 2 | ..... | No Deadline |
| 151 | Assessment 2 | Completed | Approved | ⌐ | ..... | Org. 1 | User 3 | ..... | No Deadline |
| 150 | Assessment 1 | Completed | Approved | ⌐ | 4 | Org. 1 | User 1 | ..... | No Deadline |

1302   1306   1304

« < · 1 > » Showing 1 · 6 Of 6

Launch Assessment   Export

Org. 1   >

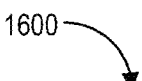

1600

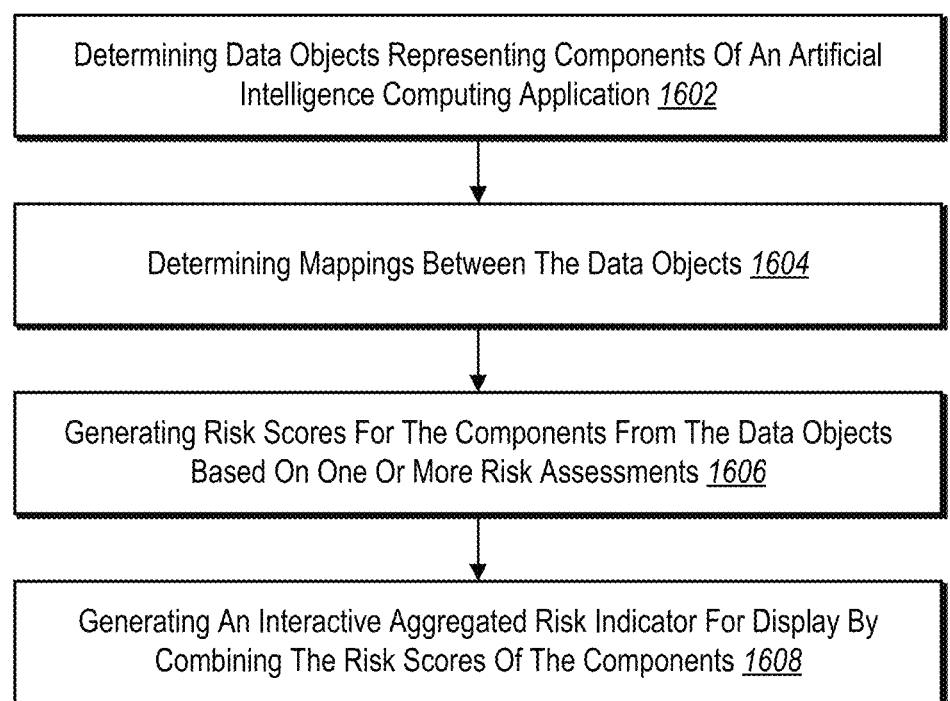

Determining Data Objects Representing Components Of An Artificial Intelligence Computing Application *1602*

Determining Mappings Between The Data Objects *1604*

Generating Risk Scores For The Components From The Data Objects Based On One Or More Risk Assessments *1606*

Generating An Interactive Aggregated Risk Indicator For Display By Combining The Risk Scores Of The Components *1608*

*Fig. 16*

FACILITATING MODIFICATION OF COMPONENTS OF ARTIFICIAL INTELLIGENCE COMPUTING APPLICATIONS VIA AGGREGATED RISK SCORES

BACKGROUND

Advances in computer processing and data storage technologies have led to significant advances in the use of artificial intelligence in many industries. For instance, many entities utilize neural networks and other machine-learning models to perform a variety of automated computing processes. Many entities in service industries also receive and process large amounts of sensitive data (e.g., personal data, financial data, or other secure data) utilizing artificial intelligence. The increased prevalence of artificial intelligence in computing has resulted in many governing bodies (e.g., governments, regulatory entities, ethics/standards entities) implementing protocols or standards for the legal, ethical, and responsible usage of artificial intelligence via specific requirements for handling digital data using machine-learning models within computing environments. For example, the governing bodies often establish system requirements frameworks that include requirements (e.g., via software/ hardware controls) for using machine-learning models to store, transmit, encrypt, process, or otherwise handle specific types of data.

Generating and managing computing applications involving artificial intelligence (e.g., machine-learning models) to automate computing processes while complying with such protocols can be a challenging and time-consuming task. For instance, tracking the use of machine-learning models and datasets used by the machine-learning models can be spread among multiple computing systems and entities, impacting the ability to accurately track which models and datasets are being used and their respective compliance with various protocols.

Conventional systems inaccurately manage machine-learning models and other artificial intelligence ("AI") tools under various protocols because the conventional systems often lack the ability to analyze such AI tools with high granularity. Indeed, many conventional systems merely manage the use of AI at system level by analyzing a particular system to determine security, privacy, or other risks associated with the system as a whole. Furthermore, because of the inability of the conventional systems to manage the use of AI with granularity, the conventional systems also lack efficiency when details of a particular machine-learning model or AI tool implementation change. Thus, while some conventional systems allow entities to monitor various types of risks associated with AI management, the conventional systems lack the ability to dynamically and granularly manage a plurality of AI tools and/or accessed datasets across a plurality of different computing applications.

SUMMARY

This disclosure describes various aspects for facilitating modification of components of artificial intelligence computing applications via aggregated risk scores of individual components. For example, the disclosed systems generate data objects representing different components of an implementation of machine-learning in an artificial intelligence computing application via a data extraction software application integrating with a digital data repository. The disclosed systems can generate risk scores for the different components of the artificial intelligence computing application in connection with the data objects. To illustrate, the disclosed systems can be used to administer one or more risk assessments according to one or more risk assessment templates and to determine attributes of the components indicating one or more risks for generating the risk scores. Additionally, the disclosed systems generate an interactive aggregated risk indicator for the artificial intelligence computing application by combining the risk scores of the individual components of the artificial intelligence computing application. The disclosed systems also provide the interactive aggregated risk indicator for display via a graphical user interface of a computing device.

BRIEF DESCRIPTION OF THE DRAWINGS

Various aspects will be described and explained with additional specificity and detail through the use of the accompanying drawings.

FIG. 7 illustrates an example of a graphical user interface for managing risk assessments for one or more artificial intelligence computing applications in accordance with some aspects.

FIG. 9 illustrates an example of a graphical user interface for generating identifying details associated with a risk assessment in accordance with some aspects.

FIG. 13 illustrates an example of a graphical user interface for providing an interactive aggregated risk indicators for an artificial intelligence computing application in accordance with some aspects.

FIG. 16 illustrates an example flowchart of a process for determining risk indicators of artificial intelligence computing applications by aggregating risk scores for components of the artificial intelligence computing applications in accordance with some aspects.

DETAILED DESCRIPTION

Figure 1:
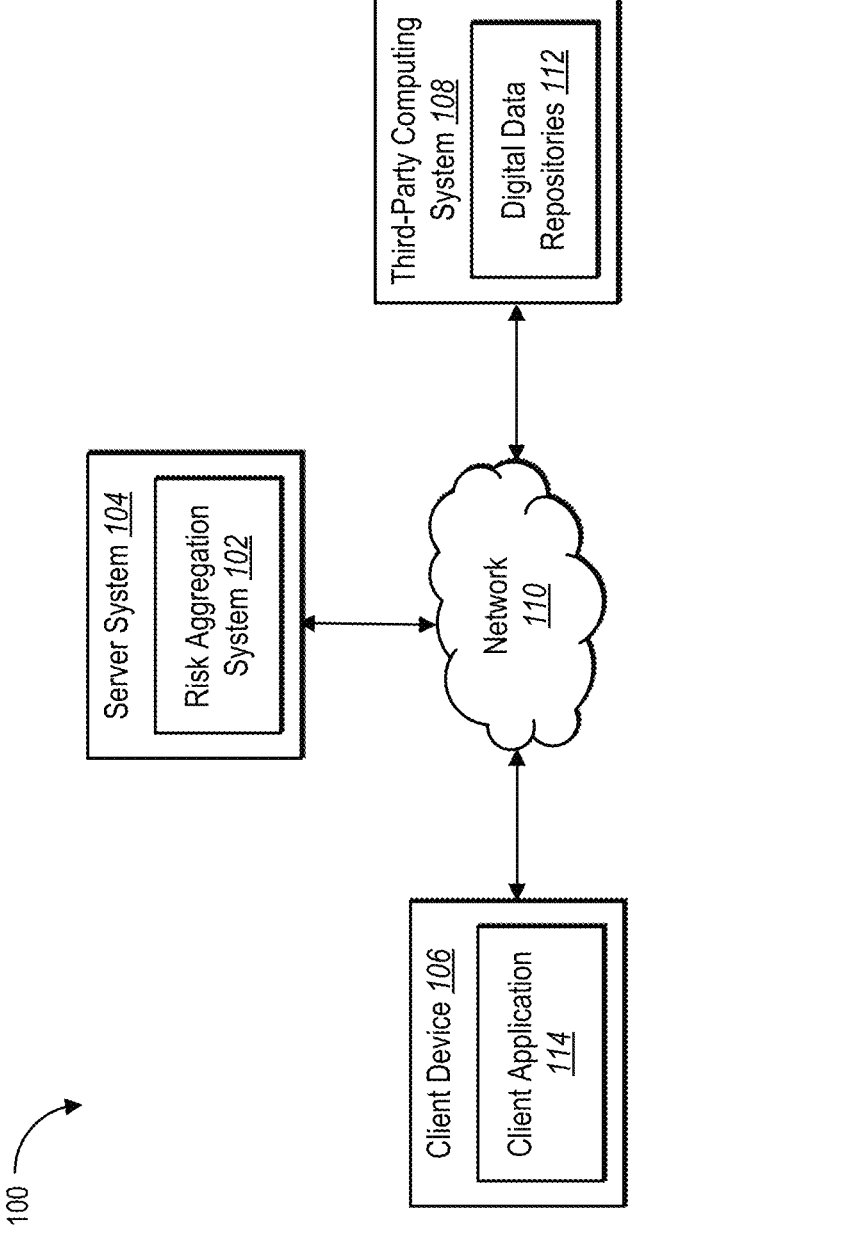
FIG. 1 illustrates an example of a system environment in which a risk aggregation system can operate in accordance with some aspects.

This disclosure describes various aspects of a risk aggregation system that generates and aggregates risk scores of individual components of an artificial intelligence computing application for determining an overall risk indicator for the artificial intelligence computing application. For example, the risk aggregation system leverages an integration with a digital data repository to generate data objects representing digital entities associated with one or more machine-learning models, one or more datasets, and/or one or more machine-learning projects (including machine-learning models or other AI tools) associated with an artificial intelligence computing application. The risk aggregation system generates separate risk scores for the components of the artificial intelligence computing application based on one or more risk assessments administered according to one or more risk templates and associates the risk scores with the respective data objects. Furthermore, the risk aggregation system aggregates the risk scores of the individual components of the artificial intelligence computing application to generate an interactive aggregated risk indicator for the artificial intelligence computing application as a whole. The risk aggregation system also provides the interactive aggregated risk indicator for display via a graphical user interface for displaying additional details and/or modifying the components of the artificial intelligence computing application in response to user interactions. By aggregating information associated with implementing machine-learning in an artificial intelligence computing application, along with detected risks, the risk aggregation system provides tools for managing the development and correction of various artificial intelligence components in a single client application.

As mentioned above, in some aspects, the risk aggregation system generates data objects representing digital entities associated with components of an artificial intelligence computing application. For instance, the risk aggregation system integrates with a digital data repository via a data extraction software application to extract and identify digital entities associated with (e.g., generated by, accessed by, stored with/in) one or more components of an artificial intelligence computing application. To illustrate, the components can include machine-learning models, datasets, and/ or machine-learning projects involving the machine-learning model(s) and dataset(s). The risk aggregation system generates data objects including attribute values to represent the digital entities of the components of the artificial intelligence computing application.

According to some aspects, the risk aggregation system generates risk scores for the components of the artificial intelligence computing application. In particular, the risk aggregation system can be used to administer one or more risk assessments according to one or more risk assessment templates to determine specific risks associated with implementing the artificial intelligence computing application. To illustrate, the risk aggregation system transmits or otherwise provides the risk assessments to computing devices of one or more users. The risk aggregation system receives updates to the risk assessments from these computing devices. The risk aggregation system determines, from the updated risk assessments, specific attributes of the components of the artificial intelligence computing application in relation to privacy and/or security standards (e.g., system requirements frameworks). For example, some system requirements frameworks require that personally identifiable information, financial information, or other protected information be handled in a certain way. Alternatively, the risk aggregation system can automatically determine the attributes of the components, such as by extracting specific data from the data objects and/or from the digital entities of the digital data repository.

In further aspects, the risk aggregation system aggregates risk scores for components of the artificial intelligence computing application to generate an interactive aggregated risk indicator for the artificial intelligence computing application. Specifically, the risk aggregation system can combine the risk scores for the machine-learning model(s), dataset(s), and/or machine-learning project(s) associated with the artificial intelligence computing application to determine an aggregated risk indicator. Thus, the risk aggregation system provides an aggregate score/indicator of risk for the artificial intelligence computing application as a whole based on a combination of risks associated with the individual components of the artificial intelligence computing application.

In some aspects, the risk aggregation system also provides graphical user interfaces for managing aggregated risks for artificial intelligence computing applications. To illustrate, the risk aggregation system can provide an interactive aggregated risk indicator for display within a graphical user interface. In response to an interaction with the interactive aggregated risk indicator, the risk aggregation system can also provide additional details associated with the separate components of the artificial intelligence computing application. For example, the risk aggregation system can provide data related to the risk scores of the separate components. In some aspects, the risk aggregation system also provides tools for manually or automatically modifying components of the artificial intelligence computing application to mitigate risks detected during the risk aggregation process.

Some aspects involve including a risk aggregation system as a component of a computing environment that includes software and/or hardware for implementing machine-learning models in connection with communication, physical, and/or information security. In these aspects, the operation of an environment including software and/or hardware for implementing machine-learning models in connection with communication, physical, and/or information security can be improved via inclusion of the risk aggregation system and operation of various data processes for addressing risks identified by the risk aggregation system, as described herein. In one example, an environment can include the risk aggregation system to analyze digital entities stored at one or more digital data repositories, and can also include computing systems that modify the digital entities in connection with risks identified for the digital entities. The risk aggregation system provides tools for managing implementation risks of machine-learning models in artificial intelligence computing applications according to various system requirements frameworks. By providing tools to manage implementation details of machine-learning models in artificial intelligence computing applications, the risk aggregation system can automatically detect specific security, privacy, or other risks associated with executing the machine-learning models. Furthermore, in some aspects, the risk aggregation system (and/or computing systems in an environment that includes the risk aggregation system) can automatically correct such risks by modifying various components of an artificial intelligence computing application or provide tools for implementing such corrections.

In some aspects, the risk aggregation system improves upon shortcomings of conventional systems in relation to managing computing systems that implement machine-learning models or other AI tools in artificial intelligence computing applications. Given the variety of computing applications that utilize machine-learning in many different technology, service, and other fields, determining the impacts of artificial intelligence computing applications in relation to various system requirements frameworks (e.g., related to various legal, security, privacy, or other standards) is a critical component of a computing environment. Conventional systems typically lack the ability to accurately identify certain risks to computing environments due to the "black box" nature of many machine-learning models. Furthermore, conventional systems lack the ability to identify risks associated with individual components of artificial intelligence computing applications, resulting in merely identifying general risks associated with systems as a whole. Thus, the conventional systems are unable to provide accurate and flexible risk detection for ensuring that all aspects of an artificial intelligence computing application comply with a given system requirements framework.

The risk aggregation system provides advantages over these conventional systems by providing tools to efficiently and accurately manage the implementation and correction of artificial intelligence computing applications with risk detection. For example, in some aspects, the risk aggregation system provides tools for integrating with one or more digital data repositories to automatically detect components of an artificial intelligence computing application and relationships between the components. In particular, the risk aggregation system utilizes a data extraction software application to automatically detect machine-learning models, datasets, computing systems that access machine-learning models such as neural networks or generate data for machine-learning models, user interface systems that interact with machine-learning models, and machine-learning projects involved in an artificial intelligence computing application. Furthermore, the risk aggregation system generates data objects representing the identified components for tracking and modifying components of the artificial intelligence computing application in connection with determined risks of the components.

Furthermore, in some aspects, the risk aggregation system provides flexible and up-to-date detection of risks in connection with various system requirements frameworks for an artificial intelligence computing application in a computing environment. Specifically, the risk aggregation system generates a risk determination for an artificial intelligence computing application by determining various risks associated with individual components of the artificial intelligence computing application. Additionally, the risk aggregation system determines risks for the artificial intelligence computing application as a whole by aggregating the risks of the individual components. By monitoring the individual components of the artificial intelligence computing application using respective data objects generated via an integration with one or more digital data repositories, the risk aggregation system can determine sources (e.g., digital entities) causing specific risks for the individual components and the artificial intelligence computing application as a whole. The risk aggregation system can also update risk detections in response to detected changes to machine-learning models, datasets, and/or data analysis projects.

Additionally, the risk aggregation system provides tools for efficiently correcting causes of risks in an artificial intelligence computing application. For instance, by determining the causes of a particular risk in an artificial intelligence computing application (e.g., in connection with a particular component), the risk aggregation system can also determine one or more data processes for eliminating or reducing the risk. To illustrate, the risk aggregation system can generate notifications indicating the causes and/or the data processes for correcting various risks along with tools to correct the risks in a given machine-learning model, dataset, and/or machine-learning project. In some aspects, the risk aggregation system also leverages an integration with one or more digital data repositories to automatically initiate data processes to correct the detected risks by modifying a machine-learning model, a dataset, and/or a machine-learning project. The risk aggregation system thus leverages integrations with computing systems to detect, isolate, and correct risks caused by data sources and/or processes within computing environments.

In some aspects, the risk aggregation system provides an improved graphical user interface for managing implementation and risk detection of machine-learning in artificial intelligence computing applications. For example, the risk aggregation system utilizes data objects representing various components of an artificial intelligence computing application to obtain and provide information associated with the components of the artificial intelligence computing application within a consolidated graphical user interface. The risk aggregation system also utilizes the data objects to generate and aggregate risk scores for separate components of an artificial intelligence computing application to determine impacts of the components on risks of the artificial intelligence computing application. The risk aggregation system can thus provide such information within the consolidated graphical user interface with tools to modify components of the artificial intelligence computing application in connection with the corresponding risk scores. Accordingly, in contrast to conventional systems that utilize separate interfaces and/or applications for managing machine-learning applications, the risk aggregation system leverages data objects and relationships between the data objects to provide detailed and granular information with interactive tools for managing machine-learning models, datasets, and other data processes involved in an artificial intelligence computing application.

Turning now to the figures, FIG. 1 includes an example of a system environment 100 in which a risk aggregation system 102 is implemented. In particular, the system environment 100 includes a server system 104, a client device

106, and a third-party computing system 108 in communication via a network 110. The third-party computing system 108 includes digital data repositories 112. The client device 106 includes a client application 114.

In some aspects, the server system 104 include or host the risk aggregation system 102. Specifically, the risk aggregation system 102 includes, or is part of, one or more systems that process digital data from the digital data repositories 112 (e.g., by communicating with the third-party computing system 108). For example, the risk aggregation system 102 provides tools to the client device 106 for managing data associated with an entity or for performing various data processes for the entity. In some aspects, the risk aggregation system 102 provides tools to the client device 106 via the client application 114 for viewing and managing information associated with data that the entity handles. To illustrate, the risk aggregation system 102 provides tools for managing data associated with various artificial intelligence computing applications stored at, or including data accessed by, the digital data repositories 112. In some aspects, the risk aggregation system 102 utilizes machine-learning management tools described in U.S. patent application Ser. No. 18/319,301, titled "MANAGING THE DEVELOPMENT AND USAGE OF MACHINE-LEARNING MODELS AND DATASETS VIA COMMON DATA OBJECTS," filed on May 17, 2023, which is herein incorporated by reference in its entirety.

As used herein, the term "data object" refers to a digital object for tracking or managing systems, software, data sources, entities, or other functions or infrastructure involved in handling specified data for an entity. For example, a data object can include a digital representation of the entity itself, a sub-entity such as subsidiary of the entity, a business unit of the entity, a data asset, a project, a machine-learning model, a dataset, or a computing operation such as a data process. In some aspects, a data object represents a digital entity extracted from the digital data repositories 112 in connection with implementing or executing one or more machine-learning models in an artificial intelligence computing application. For example, a data object includes a digital file with attribute values corresponding to a machine-learning model, a dataset, or a machine-learning project involving a machine-learning model in connection with an artificial intelligence computing application. Accordingly, in some aspects, the risk aggregation system 102 generates and stores data objects of different types (e.g., model objects, dataset objects, project objects) based on the corresponding digital entities extracted from the digital data repositories 112.

In some aspects, the term "digital entity" refers to a computer file or a group of computer files. For example, a digital entity can include one or more computer files in a database. Additionally, a digital entity can include one or more computer files in a computing application, script, or executable. To illustrate, a digital entity can include one or more computer files involved in implementing a machine-learning model, including the computer files of the machine-learning model itself, computer files in a dataset accessed or generated by the machine-learning model, computer files of an application having access to the machine-learning model, or computer files associated with implementing/testing/validating the machine-learning model (e.g., in a machine-learning project). Furthermore, a digital entity can include additional computer files associated with implementing an artificial intelligence computing application.

As used herein, the term "machine-learning model" refers to a computer representation that is tuned (e.g., trained)

based on inputs to approximate unknown functions. For instance, a machine-learning model could include a neural network having one or more layers or artificial neurons that approximate unknown functions by analyzing known data at different levels of abstraction. In some aspects, a machine-learning model includes one or more neural network layers including, but not limited to, a deep learning model, a convolutional neural network, a transformer neural network, a recurrent neural network, a fully-connected neural network, a classification neural network, or a combination of a plurality of neural networks and/or neural network types.

Additionally, as used herein, the term "artificial intelligence computing application" refers to a computing system or computing environment in which one or more machine-learning models are implemented. For example, an artificial intelligence computing application can include a computing application that utilizes one or more machine-learning models to generate, analyze, or modify data and/or data processes. To illustrate, an artificial intelligence computing application can include a computing application that collects or analyzes data obtained from one or more computing devices in relation to providing services to users in the medical space, data security space, data privacy space, or any space in which data is covered by one or more system requirements frameworks. Furthermore, as used herein, the term "data process" refers to a computing process that performs one or more actions associated with specified data. To illustrate, a data process can include, but is not limited to, a computing process or action corresponding to execution of processing instructions (e.g., by utilizing a machine-learning model) to process, collect, access, store, retrieve, modify, or delete target data.

In one or more additional or alternative aspects, the risk aggregation system 102 generates/stores a data object representing a component of an artificial intelligence computing application such as, but not limited to, a machine-learning model, a dataset, a machine-learning project, or other computing components such as a computing system, a data asset, a software application, a website, a mobile application, or a data storage/repository. To illustrate, a data object for a data asset can represent a digital data repository (e.g., the digital data repositories 112) in the form of a database used for storing specified data. Additionally or alternatively, a data object for a data asset can represent the third-party computing system 108, or other systems. The risk aggregation system 102 thus generates and stores a plurality of data objects (e.g., at the digital data repositories 112) representing different components of an artificial intelligence computing application.

In some aspects, the risk aggregation system 102 also provides tools for using the data objects to manage functions or infrastructure of artificial intelligence computing applications subject to one or more laws, regulations, or standards. To illustrate, certain types of data are subject to certain requirements/controls in how the data is handled (e.g., processed, transmitted, stored). Accordingly, the risk aggregation system 102 analyzes the data objects (e.g., via one or more machine-learning projects) to determine whether the functions or infrastructure (e.g., machine-learning models, datasets, machine-learning projects) represented by the data objects are in compliance with a system requirements framework that indicates the specific requirements/controls. For example, the risk aggregation system 102 utilizes the data objects to determine specific risks associated with an artificial intelligence computing application and its individual components.

In some aspects, a system requirements framework includes a set of computer-based requirements for handling data or otherwise configuring an entity's functions or infrastructure in accordance with a corresponding standard, regulation, or law. More specifically, a system requirements framework includes digital data requirements (e.g., for software functions or hardware infrastructure) in connection with handling certain data types in a computing environment. As an example, a system requirements framework includes specific requirements for handling data in view of a set of practices established by the International Organization for Standardization ("ISO"), internally by a particular organization (e.g., a multinational corporation), or a territory government (e.g., the European Union).

According to some aspects, the risk aggregation system 102 manages data objects by communicating with the third-party computing system 108. Specifically, the risk aggregation system 102 can communicate with the third-party computing system 108 to generate data objects for an artificial intelligence computing application and/or to determine or otherwise obtain information associated with the data objects for managing the artificial intelligence computing application. In some aspects, the client device 106 controls or uses the third-party computing system 108 for the entity. The risk aggregation system 102 can communicate with the digital data repositories 112 at the third-party computing system 108 on behalf of the entity via an integration that is configured with the entity's credentials (e.g., via an integrated data extraction software application). The risk aggregation system 102 can obtain metadata or other information about the infrastructure or functions used by the entity and thereby populate attributes of the data objects with this information.

Figure 4:
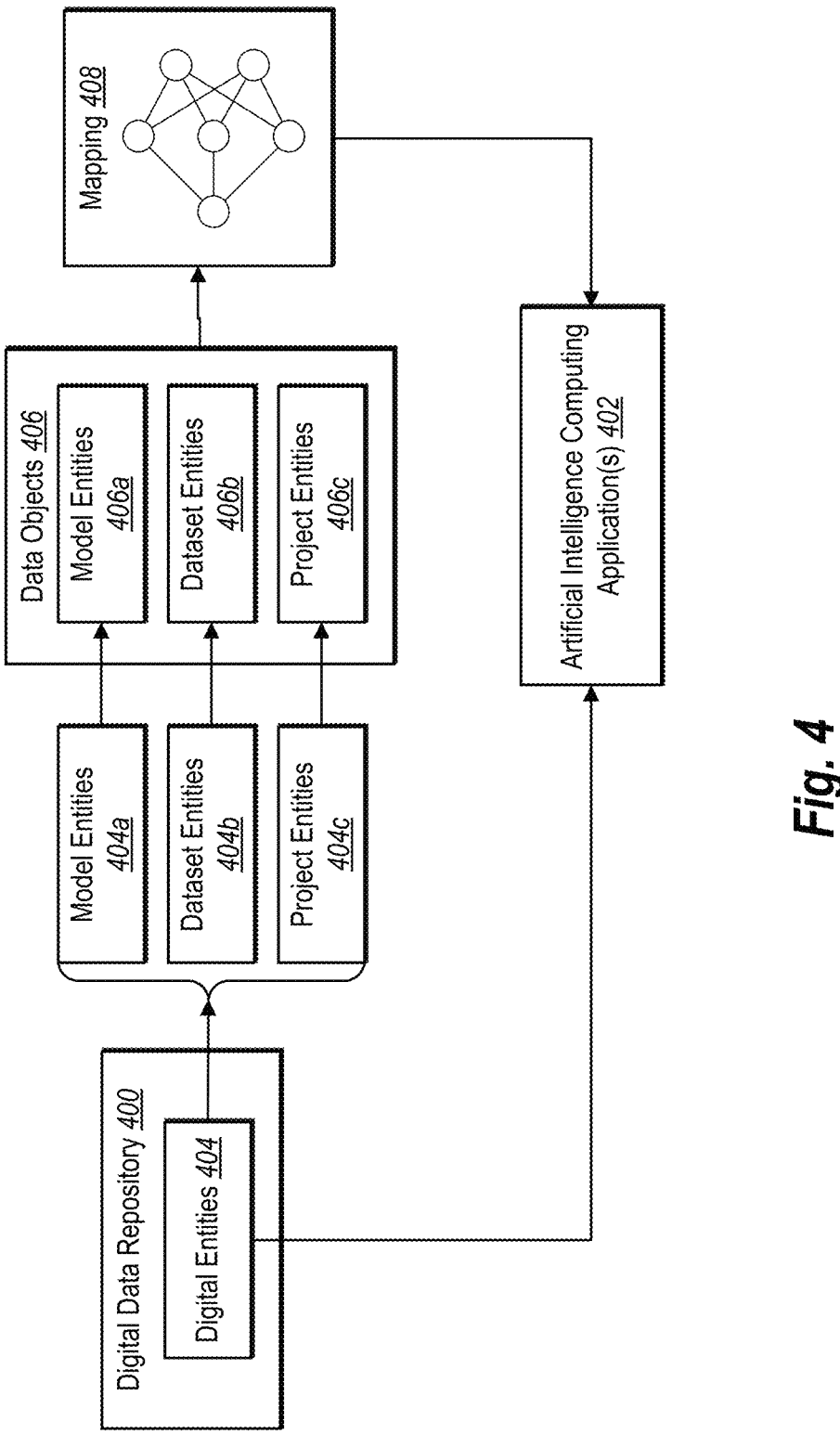
FIG. 4 illustrates an example of a process for generating a mapping of data objects to entities corresponding to components of one or more artificial intelligence computing applications in accordance with some aspects.

In one or more aspects, the term "data extraction software application" refers to a computing application that operates on a computing device to extract data from the computing device or another computing device. In one example, the risk aggregation system 102 includes a data extraction software application to access the digital data repositories 112 at the third-party computing system 108 utilizing credentials (e.g., login information, tokens) and extract (e.g., obtain) data including files, directories, or data within files. Additionally or alternatively, the risk aggregation system 102 utilizes a data extraction software application to install one or more scripts, functions, or components of the data extraction software application at one or more other computing devices (e.g., the digital data repositories 112 and/or the third-party computing system 108). FIG. 4 provides an example of an integration of a data extraction software application with a digital data repository. Thus, the risk aggregation system 102 can integrate with the digital data repositories 112 at the third-party computing system 108 via the data extraction software application.

In additional or alternative aspects, the risk aggregation system 102 communicates with the client device 106 to obtain information associated with the data objects or to provide information about the data objects for display within the client application 114. For instance, the risk aggregation system 102 can obtain, via user input received from an administrator client device, metadata or other information about the infrastructure or functions (e.g., components of an artificial intelligence computing application) used by the entity and thereby populate attributes of the data objects with this information.

In some aspects, the third-party computing system 108 include server devices, individual client devices, or other computing devices associated with an entity. For instance, a third-party computing system includes one or more computing devices for performing a data process involving utilizing a machine-learning model to handle data associated with one or more operations of the entity subject to a particular system requirements framework. To illustrate, the third-party computing system includes one or more server devices that generate, process, store, or transmit payment card processing data subject to PCI DSS in one or more jurisdictions. As an example, a system requirements framework that covers processes or systems handing such data to be encrypted in a specific way, include a specific format, and/or be transmitted via specific protocols. Thus, the system requirements framework may include a requirement that artificial intelligence computing applications including such processes be implemented in a specific way to comply with all of the corresponding data handling requirements.

In some aspects, the server system 104 include a variety of computing devices, including those described below with reference to FIG. 17. For example, the server system 104 includes one or more servers for storing and processing data associated with artificial intelligence computing applications. In some aspects, the server system 104 also include a plurality of computing devices in communication with each other, such as in a distributed storage environment. In some aspects, the server system 104 include a content server. The server system 104 also optionally includes an application server, a communication server, a web-hosting server, a social networking server, a digital content campaign server, or a digital communication management server.

In some aspects, the client device 106 includes, but is not limited to, a desktop, a mobile device (e.g., smartphone or tablet), or a laptop including those explained below with reference to FIG. 17. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data associated with artificial intelligence computing applications. In some aspects, the client device 106 also performs functions for generating, capturing, or accessing data to provide to the risk aggregation system 102 in connection with determining and/or mitigating risks for artificial intelligence computing applications. For example, the client device 106 communicates with the server system 104 via the network 110 to provide information (e.g., user interactions) associated with data objects. Although FIG. 1 illustrates the system environment 100 with a single client device, in some aspects, the system environment 100 includes a plurality of client devices. In some aspects, the client device 106 or another system hosts the digital data repositories 112.

Additionally, as shown in FIG. 1, the system environment 100 includes the network 110. The network 110 enables communication between components of the system environment 100. In some aspects, the network 110 may include the Internet or World Wide Web. In additional or alternative aspects, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server system 104, the client device 106, and the third-party computing system 108 communicate via the network using one or more communication platforms and technologies suitable for transporting data and/or communication signals, including any known communication technologies, devices, media, and protocols supportive of data communications, examples of which are described with reference to FIG. 17.

Although FIG. 1 illustrates the server system 104, the client device 106, the digital data repositories 112, and the third-party computing system 108 communicating via the network 110, in additional or alternative aspects, the various components of the system environment 100 communicate and/or interact via other methods (e.g., the server system 104, the client device 106, the digital data repositories 112, and/or the third-party computing system 108 can communicate directly). Furthermore, although FIG. 1 illustrates the risk aggregation system 102 and the digital data repositories 112 being implemented separately within the system environment 100, the risk aggregation system 102 can alternatively be implemented, in whole or in part, by a particular component and/or device within the system environment 100 (e.g., the server system 104). Additionally or alternatively, the third-party computing system 108 can include the client device 106. In some aspects, the digital data repositories 112 are stored at the server system 104, the client device 106, or at a different device or system.

In some aspects, the server system 104 can support the risk aggregation system 102 on the client device 106. For instance, the server system 104 generates/maintains the risk aggregation system 102 and/or one or more components of the risk aggregation system 102 for the client device 106. The server system 104 provides the risk aggregation system 102 to the client device 106 (e.g., as part of a software application/suite). In other words, the client device 106 obtains (e.g., downloads) the risk aggregation system 102 from the server system 104. At this point, the client device 106 is able to utilize the risk aggregation system 102 to manage risks of artificial intelligence computing applications independently from the server system 104.

In additional or alternative aspects, the risk aggregation system 102 includes a web hosting application that allows the client device 106 to interact with content and services hosted on the server system 104. To illustrate, in some aspects, the client device 106 accesses a web page supported by the server system 104. The client device 106 provides input to the server system 104 to perform risk management operations, and, in response, the risk aggregation system 102 on the server system 104 performs operations to view/manage data associated with mitigating risks for artificial intelligence computing applications. The server system 104 provide the output or results of the operations to the client device 106.

Figure 2:
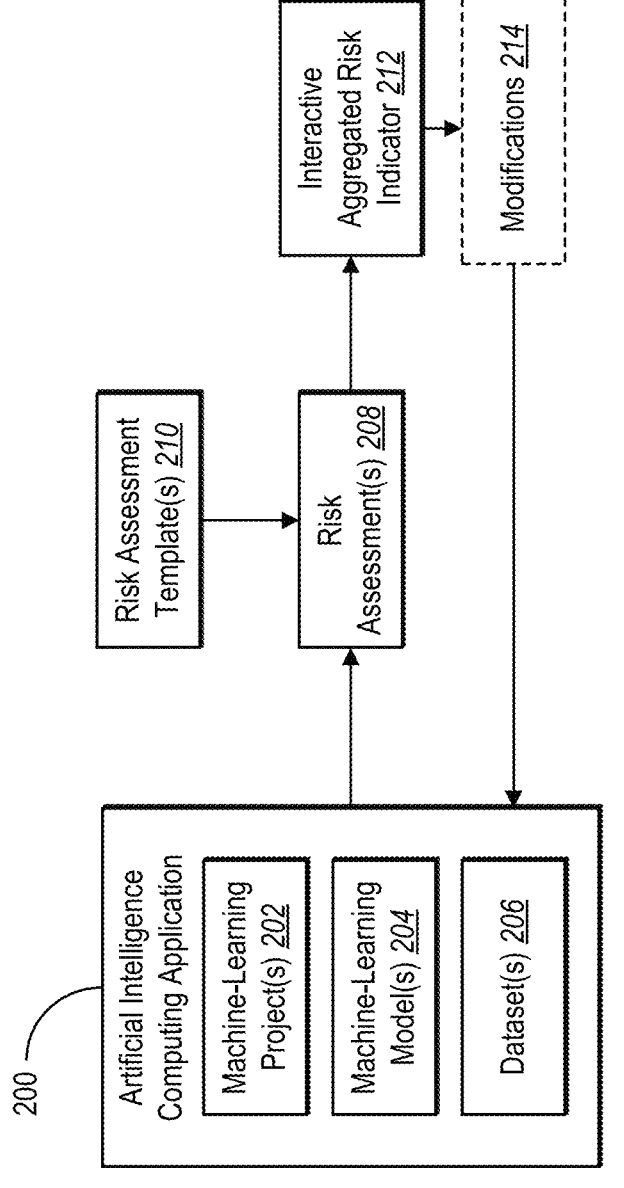
FIG. 2 illustrates an example of the risk aggregation system generating an interactive aggregated risk indicator for components of an artificial intelligence computing application in accordance with some aspects.

As mentioned, the risk aggregation system 102 provides risk management for artificial intelligence computing applications. FIG. 2 illustrates an example of the risk aggregation system 102 determining an aggregated risk for an artificial intelligence computing application based on individual components of the artificial intelligence computing application according to various risk assessments. Furthermore, FIG. 2 illustrates the risk aggregation system 102 providing an interactive aggregated risk indicator for modifying one or more components of an artificial intelligence computing application to mitigate the determined risks.

In particular, as illustrated in FIG. 2, the risk aggregation system 102 determines an artificial intelligence computing application 200 including a plurality of different components. For example, the risk aggregation system 102 determines the artificial intelligence computing application 200 by integrating with one or more digital data repositories. The risk aggregation system 102 extracts data indicating various components of the artificial intelligence computing application 200 from the one or more digital data repositories.

To illustrate, the risk aggregation system 102 determines that the artificial intelligence computing application 200 includes machine-learning project(s) 202, machine-learning model(s) 204, and dataset(s) 206. For instance, the machine-learning project(s) 202 include one or more implementations of one or more of the machine-learning model(s) 204 for a particular entity, in a particular computing environment, and/or with specific implementation details (e.g., with one or more of the dataset(s) 206). Furthermore, the machine-learning project(s) 202 can include training, testing, and validating the machine-learning model(s) 204 via the dataset(s) 206 and/or additional information stored with the artificial intelligence computing application 200. In some aspects, the artificial intelligence computing application 200 provides machine-learning operations to a particular computing device or a set of computing devices. Additionally, the artificial intelligence computing application 200 can be a standalone computing application or part of a suite of computing applications that leverage the machine-learning model(s) 204.

As illustrated in FIG. 2, in some aspects, the risk aggregation system 102 calculates a risk level for the artificial intelligence computing application 200 based on risks of the individual components of the artificial intelligence computing application 200. In particular, the risk aggregation system 102 can use risk assessment(s) 208 to determine risk levels of the machine-learning project(s) 202, the machine-learning model(s) 204, and the dataset(s) 206. In some aspects, the risk aggregation system 102 generates and administers the risk assessment(s) 208 based on risk assessment template(s) 210. For example, FIGS. 3 and 5 and the corresponding description provide additional detail related to administering a risk assessment for determining a risk for an artificial intelligence computing application.

Furthermore, as illustrated in FIG. 2, the risk aggregation system 102 generates an interactive aggregated risk indicator 212. Specifically, the risk aggregation system 102 combines risks calculated for the separate components of the artificial intelligence computing application 200 to generate the interactive aggregated risk indicator 212. For example, the risk aggregation system 102 combines risk values generated for the machine-learning project(s) 202, the machine-learning model(s) 204, and the dataset(s) 206 associated with the artificial intelligence computing application 200 to generate the interactive aggregated risk indicator 212. To illustrate, FIG. 3 and the corresponding description provide additional description related to aggregating risk scores of individual components of an artificial intelligence computing application to generate an interactive aggregated risk indicator.

Figure 6:
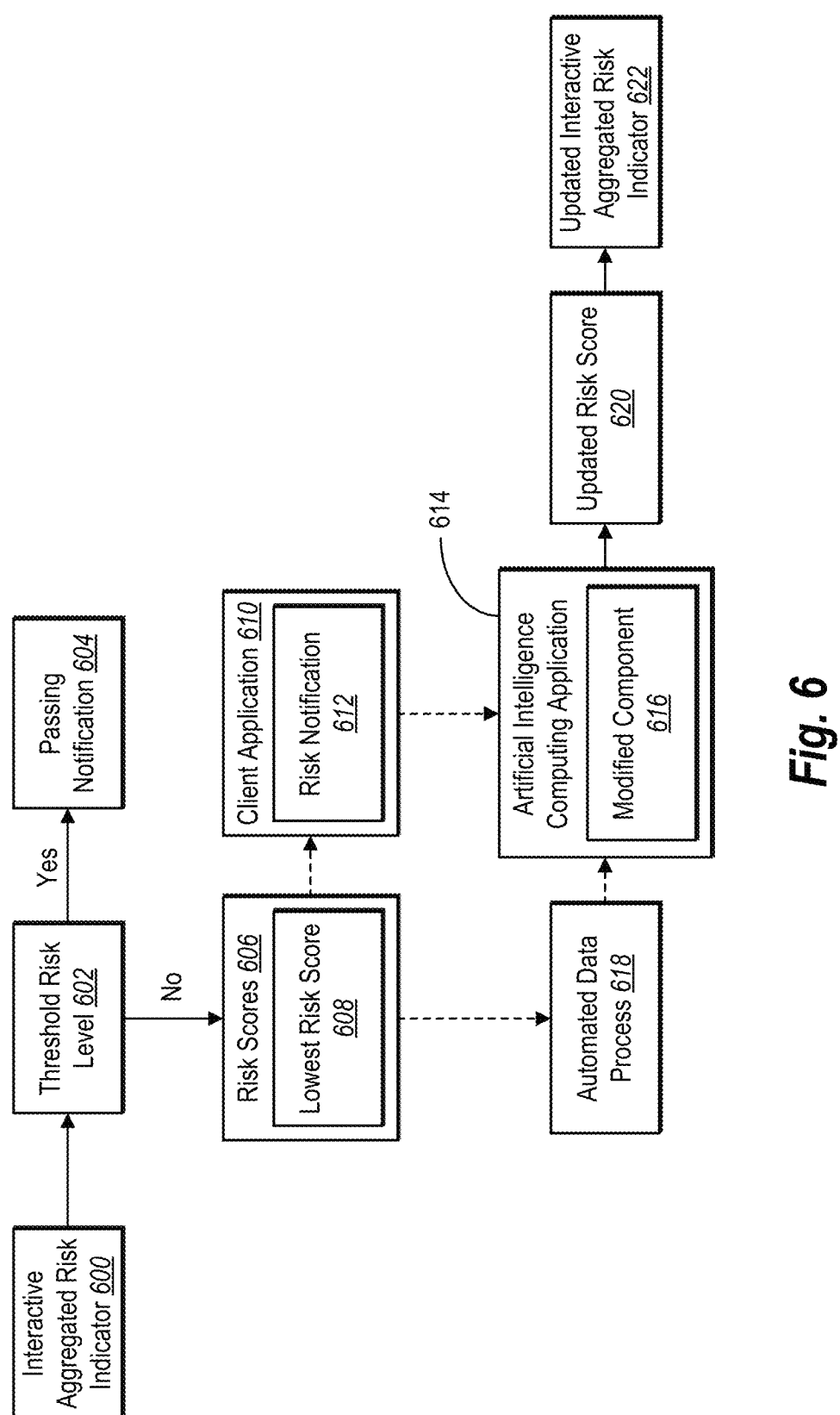
FIG. 6 illustrates an example of a process for updating an interactive aggregated risk indicator in response to changes to one or more components of an artificial intelligence computing application in accordance with some aspects.

In some aspects, the risk aggregation system 102 utilizes the interactive aggregated risk indicator 212 to modify the artificial intelligence computing application 200. To illustrate, the risk aggregation system 102 can provide the interactive aggregated risk indicator 212 to one or more computing devices, which a user can utilize to apply modifications 214 to one or more components of the artificial intelligence computing application 200 to mitigate determined risks. Alternatively, the risk aggregation system 102 can utilize the interactive aggregated risk indicator 212 to automatically execute one or more operations to apply the modifications 214 to one or more components of the artificial intelligence computing application to mitigate the determined risks. In additional or alternative aspects, the risk aggregation system 102 can provide the interactive aggregated risk indicator 212 to a third-party computing system (e.g., the third-party computing system 108 of FIG. 1). The third-party computing system can implement one or more modifications 214 to mitigate the risks indicated by the interactive aggregated risk indicator 212. In additional or alternative aspects, the risk aggregation system 102 can instruct a third-party computing system, via one or more integrations, to implement one or more modifications 214 to mitigate the risks indicated by the interactive aggregated risk indicator 212. FIG. 6 and the corresponding description provide additional detail associated with modifying a component of an artificial intelligence computing application.

Figure 3:
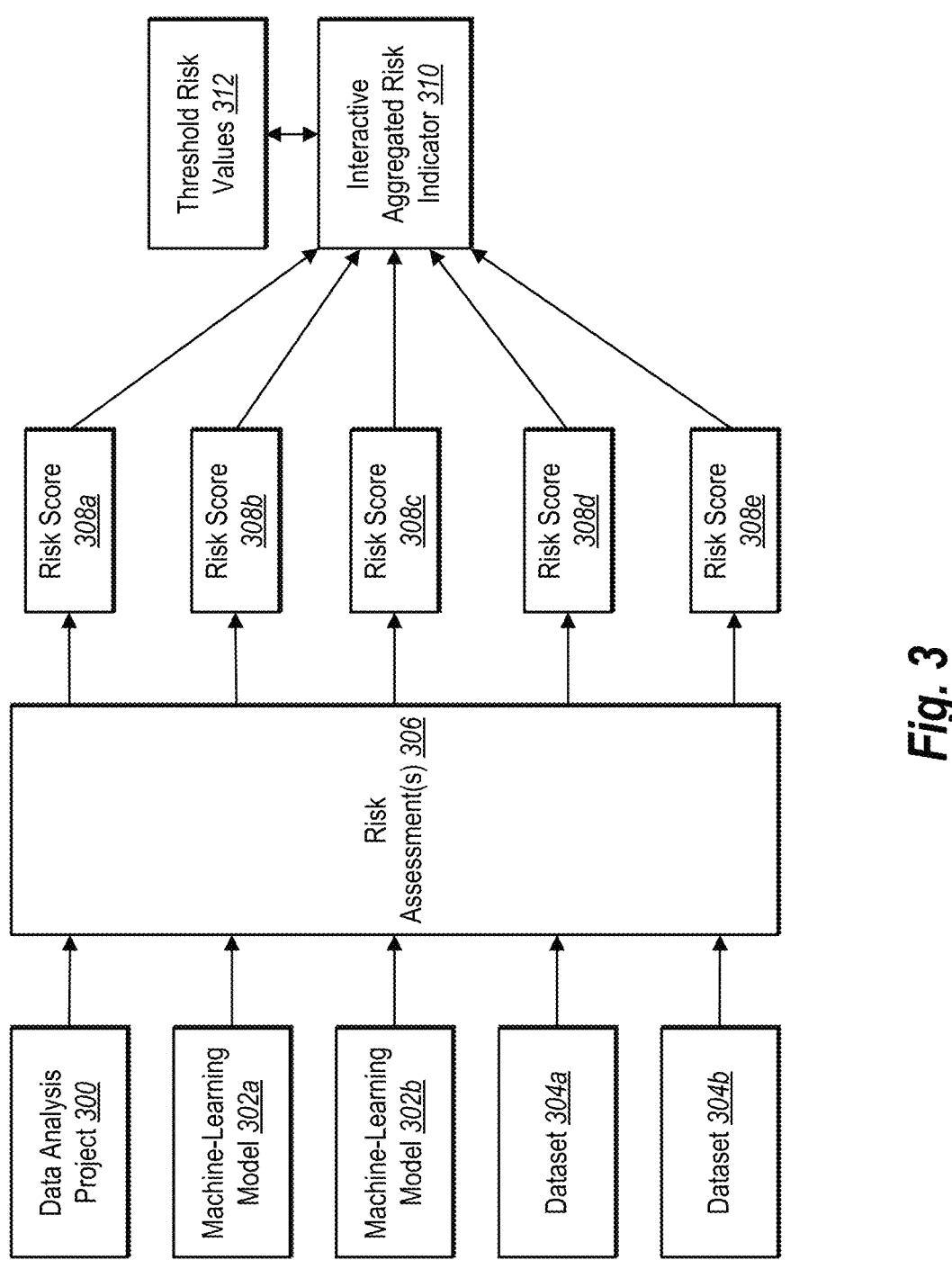
FIG. 3 illustrates an example of a process for generating an interactive aggregated risk indicator by combining risk scores for components of an artificial intelligence computing application in accordance with some aspects.

As mentioned, in some aspects, the risk aggregation system 102 determines a risk level of an artificial intelligence computing application by combining risks associated with individual components of the artificial intelligence computing application. FIG. 3 illustrates an example of the risk aggregation system 102 determining an overall risk for an artificial intelligence computing application based on individual risks for separate components of the artificial intelligence computing application. Specifically, FIG. 3 illustrates the risk aggregation system 102 generating separate risk scores for the components of the risk aggregation system 102 and combining the separate risks to determine the overall risk of the artificial intelligence computing application.

In some aspects, the risk aggregation system 102 determines a plurality of components of an artificial intelligence computing application. For example, the risk aggregation system 102 determines a machine-learning project 300 corresponding to a machine-learning implementation within the artificial intelligence computing application. To illustrate, the machine-learning project 300 includes implementation details for implementing one or more machine-learning models in connection with one or more data processes in the artificial intelligence computing application. Specifically, the implementation details can include specific computing operations that call the machine-learning model(s), tasks associated with the machine-learning model(s), testing/training/validating details for the machine-learning model(s), updating/retraining schedules for the machine-learning model(s), or other operations associated with implementing and managing the machine-learning model(s) in the artificial intelligence computing application.

Additionally, as illustrated, the risk aggregation system 102 determines a first machine-learning model 302a and a second machine-learning model 302b associated with the machine-learning project 300 in the artificial intelligence computing application. In particular, the risk aggregation system 102 can determine that the machine-learning project 300 utilizes the first machine-learning model 302a and/or the second machine-learning model 302b for one or more computing operations. To illustrate, the risk aggregation system 102 can determine that a particular set of digital entities stored at a digital data repository are accessed by (or store information for executing) a machine-learning model in the artificial intelligence computing application.

Furthermore, the risk aggregation system 102 determines a first dataset 304a and second dataset 304b associated with the machine-learning project 300 in the artificial intelligence computing application. In some aspects, the risk aggregation system 102 determines via an integration with a digital data repository that a particular machine-learning model (e.g., the first machine-learning model 302a) accesses or stores information in the first dataset 304a. Additionally, the risk aggregation system 102 can determine that a machine-learning model (e.g., the second machine-learning model

302b) accesses or stores information in the second dataset 304b. In some examples, the risk aggregation system 102 can also determine that a single machine-learning model accesses or stores information in a plurality of datasets, such as by determining a test dataset, a validation dataset, or an inference-time dataset. In additional examples, the risk aggregation system 102 can determine that a plurality of machine-learning models access a single dataset (e.g., in connection with performing a plurality of different computing operations on the dataset).

In response to determining the separate components of the artificial intelligence computing application, the risk aggregation system 102 can generate a plurality of risk scores for the separate components. For instance, the risk aggregation system 102 administers risk assessment(s) 306 to generate the risk scores. To illustrate, as mentioned, the risk aggregation system 102 generates the risk assessment(s) 306 based on one or more risk templates, which may correspond to one or more data categories of data types covered by one or more system requirements frameworks. In some aspects, the risk aggregation system 102 generates and administers a plurality of risk assessments corresponding to a plurality of system requirements frameworks. Alternatively, the risk aggregation system 102 generates and administers a single risk assessment corresponding to a plurality of system requirements frameworks.

As an example, the risk aggregation system 102 generates a risk assessment including questions and/or operations to assess a risk caused by a component of the artificial intelligence computing application in connection with handling a particular data type covered by a system requirements framework for a particular computer data security standard. Accordingly, the risk aggregation system 102 can generate a risk assessment including questions and/or data processes to determine data indicating whether one or more computing systems involved in handling the particular data type meets digital data requirements of the system requirements framework for the computer data security standard. The risk aggregation system 102 can administer the risk assessment by providing a plurality of questions to one or more computing devices for one or more users to respond to the questions. In some aspects, the risk aggregation system 102 administers the risk assessment by executing one or more data processes to automatically extract data that answers the questions or otherwise determines specific attribute values for data objects representing the components of the artificial intelligence computing application, such as via an integration with a digital data repository.

As illustrated in FIG. 3, the risk aggregation system 102 utilizes data from the risk assessment(s) 306 to generate risk scores for the separate components of the artificial intelligence computing application. In particular, as illustrated, the risk aggregation system 102 generates a first risk score 308a corresponding to the machine-learning project 300. For example, the risk aggregation system 102 utilizes data from the risk assessment(s) 306 in connection with digital entities and/or one or more data objects corresponding to the machine-learning project 300 to generate the first risk score 308a.

To illustrate, the risk aggregation system 102 can utilize data from the risk assessment(s) 306 to generate the first risk score 308a. In some aspects, the risk aggregation system 102 generates the first risk score 308a by comparing one or more attribute values to one or more threshold values, determining whether specific attribute values are populated or null, and/or comparing attribute values to one or more other attribute values. Additionally, the risk aggregation system 102 can weight certain attribute values for a particular component more than other attribute values (e.g., such that a first attribute value has a greater impact on a risk score than a second attribute value).

As further illustrated, the risk aggregation system 102 generates one or more risk scores for one or more machine-learning models. For instance, the risk aggregation system 102 generates a second risk score 308b for the first machine-learning model 302a and a third risk score 308c for the second machine-learning model 302b. As shown, the risk aggregation system 102 can determine that each of the machine-learning models represent separate components of the artificial intelligence computing application. Accordingly, the risk aggregation system 102 can generate the corresponding risk scores based on the respective risks associated with the first machine-learning model 302a and the second machine-learning model 302b.

Furthermore, as illustrated in FIG. 3, the risk aggregation system 102 generates risk scores for one or more datasets involved in the artificial intelligence computing application. Specifically, the risk aggregation system 102 generates a fourth risk score 308d for the first dataset 304a and a fifth risk score 308e for the second dataset. As noted previously, each of the first dataset 304a and the second dataset 304b may correspond to separate machine-learning models or the same machine-learning model. The risk aggregation system 102 generates the risk scores for the datasets based on whether the datasets comply with the system requirements framework(s) corresponding to the risk assessment(s) 306.

In response to generating the risk scores for the components of the artificial intelligence computing application, the risk aggregation system 102 generates an interactive aggregated risk indicator 310. For example, the risk aggregation system 102 combines the risk scores for the separate components into an aggregated risk score. To illustrate, the risk aggregation system 102 can determine the aggregated risk score by averaging the risk scores of the components. Alternatively, the risk aggregation system 102 can determine the aggregated risk score by summing or multiplying the risk scores of the individual components or via another aggregation algorithm such as a min, max, or user-defined algorithm. In some aspects, the risk aggregation system 102 also weights the risk scores based on overall impact on the artificial intelligence computing application (e.g., certain components may have a greater impact on the risk of the artificial intelligence computing application than other components).

According to some aspects, the risk aggregation system 102 utilizes an aggregated risk score to generate the interactive aggregated risk indicator 310. In particular, the risk aggregation system 102 can generate the interactive aggregated risk indicator 310 by comparing the aggregated risk score to threshold risk values 312. For instance, the threshold risk values 312 can delineate various risk levels (e.g., high, medium, low), which the risk aggregation system 102 can use to determine whether the aggregated risk score falls into a particular risk level according to the threshold risk values 312. Alternatively, the risk aggregation system 102 can compare the interactive aggregated risk indicator 310 to one or more threshold risk values. The risk aggregation system 102 can thus generate the interactive aggregated risk indicator 310 by utilizing the corresponding risk level to generate an interactive element representing the risk level for display within a graphical user interface. In alternative aspects, the risk aggregation system 102 determines the interactive aggregated risk indicator 310 by directly converting the aggregated risk score to an interactive element for display within a graphical user interface.

As mentioned, the risk aggregation system 102 can generate data objects representing various components of an artificial intelligence computing application. FIG. 4 illustrates an example of a process for generating and associating data objects utilizing an integration with a digital data repository. More specifically, the risk aggregation system 102 can extract data from the digital data repository, classify the data in connection with one or more components, generate data objects according to the classifications, and determine relationships between the data objects according to relationships of the components in the artificial intelligence computing application.

As illustrated in FIG. 4, in some aspects, the risk aggregation system 102 integrates with a digital data repository 400 to identify data associated with artificial intelligence computing application(s) 402. Specifically, the risk aggregation system 102 utilizes a data extraction software application to extract or otherwise identify digital entities 404 at the digital data repository 400. For example, the risk aggregation system 102 identifies computer files stored at the digital data repository 400 including data storage files, executable files, or other files associated with an entity.

In some aspects, the risk aggregation system 102 utilizes a classifier model (e.g., a neural network classifier with a plurality of classifiers trained on specific data types) to determine specific entity types from the digital entities 404. For instance, the risk aggregation system 102 can determine whether particular digital entities correspond to components (e.g., machine-learning models, datasets, or machine-learning projects) of the artificial intelligence computing application(s) 402. Accordingly, the risk aggregation system 102 utilizes the classifier model to classify the digital entities 404 as model entities 404a, dataset entities 404b, and/or project entities 404c. In addition, the risk aggregation system 102 can utilize the integration of the data extraction software application to determine specific data types related to specific risks (e.g., highly sensitive data such as personally identifiable information).

In response to extracting data from the digital data repository 400, the risk aggregation system 102 can generate data objects 406 corresponding to the various entities. In particular, the risk aggregation system 102 can generate model objects 406a representing the model entities 404a, dataset objects 406b representing the dataset entities 404b, and project objects 406c representing the project entities 404c. Additionally, the risk aggregation system 102 can generate and store attribute values in the corresponding data objects representing the various components of the artificial intelligence computing application(s) 402 based on the information identified for the various digital entities. In some embodiments, the attribute values can also indicate whether a particular data object includes a particular data type (e.g., a sensitive data type corresponding to a particular risk).

The risk aggregation system 102 can also generate a mapping 408 indicating relationships involving the data objects 406 and linking the data objects to the artificial intelligence computing application. Specifically, the risk aggregation system 102 can determine the relationships involving the data objects 406 based on relationships identified for the digital entities 404 (e.g., via an integration of a data extraction software application with the digital data repository 400). More specifically, the risk aggregation system 102 generates the mapping 408 to include a plurality of mappings between data objects corresponding to specific components of the artificial intelligence computing application according to relationships between the corresponding entities. For instance, the risk aggregation system 102 can generate the mapping 408 to indicate a link between a model object and a dataset object, a link between the model object and the project object, and/or a link between the dataset object and the project object. Accordingly, the risk aggregation system 102 can determine whether a particular machine-learning model accesses a particular dataset and also whether the machine-learning model is implemented in a particular machine-learning project and store such information in the mapping 408.

The risk aggregation system 102 can utilize the mapping 408 to generate risk scores for the specific components of the artificial intelligence computing application(s) 402 and determine how to combine the risk scores for generating interactive aggregated risk indicators. Specifically, as described in more detail below, the risk aggregation system 102 accesses risk score information from the data objects to determine a risk score for the artificial intelligence computing application(s) 402. Additionally, the risk aggregation system 102 aggregates the risk scores of the data objects based on the mappings between the data objects from the mapping 408.

Figure 5:
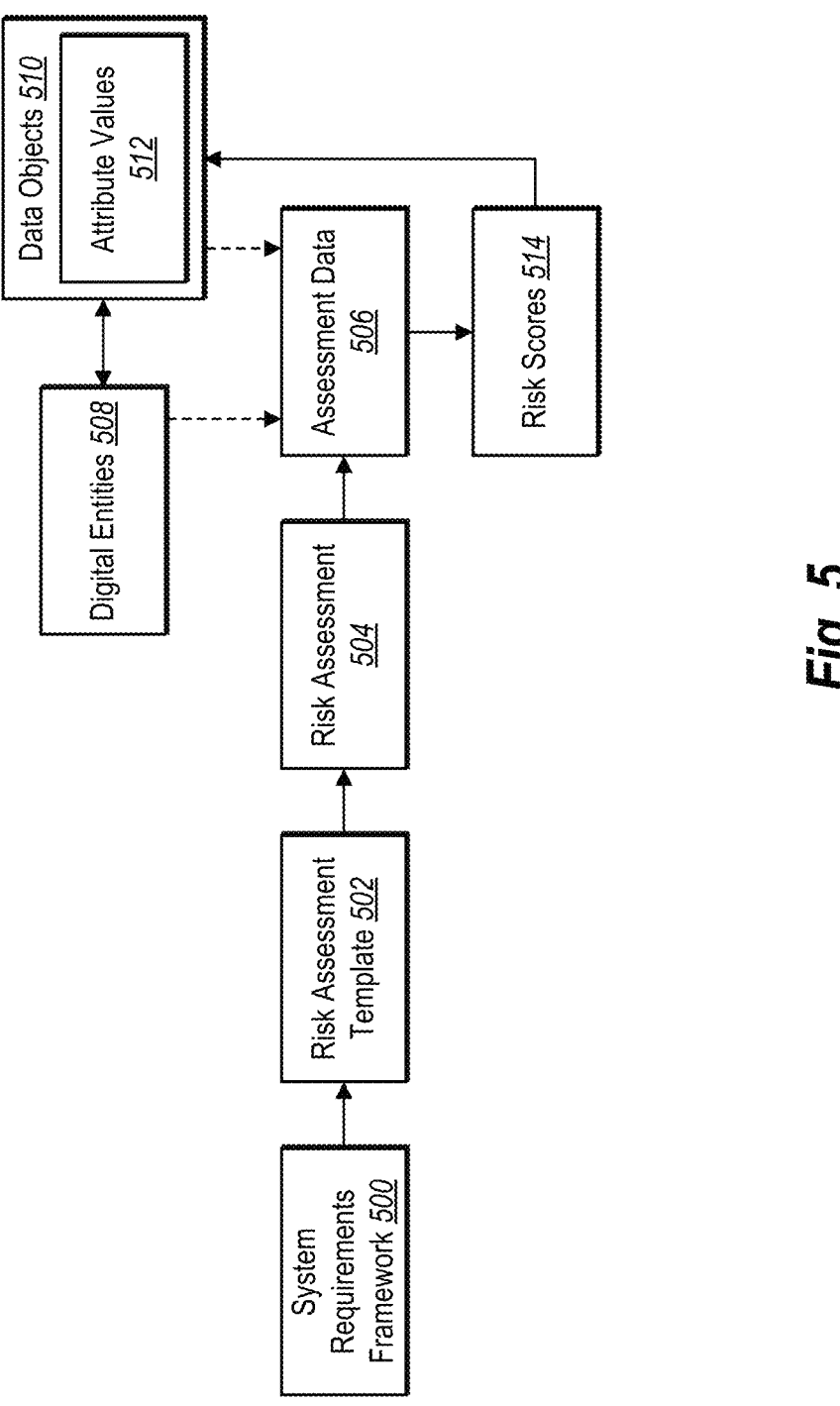
FIG. 5 illustrates an example of a process for utilizing a risk assessment to generate risk scores for data objects for components of an artificial intelligence computing application in accordance with some aspects.

In some aspects, as mentioned, the risk aggregation system 102 administers one or more risk assessments to generate risk scores for data objects representing components of an artificial intelligence computing application. FIG. 5 illustrates an example of a process for utilizing a risk assessment to generate risk scores. Specifically, the risk aggregation system 102 utilizes a risk assessment template to generate and administer the risk assessment in connection with data extracted from a digital data repository.

As illustrated in FIG. 5, the risk aggregation system 102 determines a system requirements framework 500 in connection with one or more standards, laws, or regulations. In particular, the standards, laws, or regulations can include requirements for handling specific data types in view of various legal, ethical, security, or privacy considerations. Accordingly, the system requirements framework 500 can include digital data requirements for a computing system to implement when handling the corresponding data types. To illustrate, the system requirements framework 500 can include requirements to exclude a particular data type from training datasets for machine-learning models, encrypt a particular data type in datasets used by machine-learning models, ensure that machine-learning models produce outputs with a threshold accuracy, etc. In various aspects, the system requirements framework 500 can also include an internal or external set of requirements relative to an entity in relation to one or more data types.

In additional aspects, the risk aggregation system 102 determines a risk assessment template 502 in relation to the system requirements framework 500. For example, the risk aggregation system 102 accesses the risk assessment template 502 at a digital data repository storing data corresponding to an artificial intelligence computing application, such that the risk assessment is customized to an entity implementing the artificial intelligence computing application. Alternatively, the risk aggregation system 102 can access the risk assessment template 502 from a shared repository corresponding to a plurality of separate entities (e.g., generated and stored in connection with the system requirements framework 500). In some examples, the risk assessment template 502 can include a set of questions and/or data processes for determining information related to various practices or implementation details for one or more machine-learning models, datasets, and/or machine-learning projects. Additionally, the risk aggregation system 102 can customize the risk assessment template 502 by selecting from a plurality of customizable options corresponding to various data categories (e.g., data types, component types, risk types) to tailor a risk assessment 504 to a specific entity or sub-entity.

In response to selecting a risk assessment template 502 for a system requirements framework 500, the risk aggregation system 102 can administer a risk assessment 504 utilizing or based on the risk assessment template 502. For instance, the risk aggregation system 102 can administer the risk assessment 504 by displaying the risk assessment template 502 (or portions of the risk assessment template 502) within a graphical user interface. The risk aggregation system 102 can utilize the risk assessment 504 to gather assessment data 506 related to an artificial intelligence computing application based on response data received in connection with the risk assessment 504. To illustrate, the risk aggregation system 102 can detect interactions with a client device to answer questions as part of the risk assessment 504, attach documents as part of the risk assessment 504, or other data received based on user interactions in connection with the risk assessment 504.

In alternative aspects, the risk aggregation system 102 utilizes automated processes to determine the assessment data 506 (or portions of the assessment data 506). Specifically, the risk aggregation system 102 can administer the risk assessment 504 by automatically implementing one or more data processes to extract the assessment data 506 from one or more data sources. For example, the risk aggregation system 102 can utilize an integration with a digital data repository to extract data from the digital data repository (or another device). In some aspects, the risk aggregation system 102 can automatically implement the one or more data processes in response to a request to automate the data extraction processes by a client device to which the risk assessment 504 was administered. For example, as mentioned previously, the risk aggregation system 102 can access data stored at a digital data repository to determine the assessment data 506.

In some aspects, for example, the risk aggregation system 102 determines the assessment data 506 by accessing digital entities 508 at the digital data repository in connection with completing the risk assessment 504. For instance, the risk aggregation system 102 can leverage an integration with the digital data repository to identify and extract data relevant to a particular question or request in the risk assessment 504. Additionally, in some aspects, the risk aggregation system 102 utilizes data objects 510 representing the digital entities 508 to determine the assessment data 506. The risk aggregation system 102 can utilize the data objects 510 (e.g., that the risk aggregation system 102 generated in an initial classification process) to identify relevant digital entities 508 associated with various components (e.g., machine-learning models, datasets, or machine-learning projects) for completing the risk assessment 504.

Alternatively, the risk aggregation system 102 can access the assessment data 506 directly from attribute values 512 of the data objects 510. As an example, the risk aggregation system 102 extracts or otherwise accesses attribute values of a first data object to generate a first risk score corresponding to a first component (e.g., a first machine-learning model or first dataset). The risk aggregation system 102 extracts or otherwise accesses attributes of a second data object to generate a second risk score corresponding to a second component (e.g., a second machine-learning model or a second dataset). In particular, the risk aggregation system 102 extracts data written to the attribute values 512 of the data objects 510 to complete the risk assessment 504.

As illustrated in FIG. 5, the risk aggregation system 102 utilizes the assessment data 506 from the risk assessment 504 to generate risk scores 514. In particular, the risk aggregation system 102 generates the risk scores 514 for the data objects 510 representing the components of the artificial intelligence computing application. For instance, the risk aggregation system 102 generates the risk scores 514 by comparing the assessment data 506 to various threshold values, by comparing certain values in the assessment data 506 to other values in the assessment data 506, based on the existence of specific data or attribute values in the assessment data 506, or based on a variety of other indicator s of specific risks in connection with the system requirements framework 500. To illustrate, the risk aggregation system 102 can generate the risk scores 514 to determine whether the digital entities 508 and/or data objects 510 present specific security or privacy risks in connection with requirements of the system requirements framework 500.

In various aspects, the risk aggregation system 102 utilizes calculated risks for an artificial intelligence computing application and its components to perform various operations. For example, the risk aggregation system 102 can present certain information for display via a client device in response to determining certain risks. Additionally, in some aspects, the risk aggregation system 102 performs various operations to modify an artificial intelligence computing application in connection with determining certain risks. FIG. 6 illustrates an example of the risk aggregation system 102 (or another suitable computing system) utilizing an aggregated risk determination for an artificial intelligence computing application to modify one or more components of an artificial intelligence computing application.

For example, as illustrated in FIG. 6, the risk aggregation system determines an interactive aggregated risk indicator 600 for an artificial intelligence computing application 614 and its components. Specifically, as previously noted, the risk aggregation system 102 determines the interactive aggregated risk indicator 600 by combining risk scores for a plurality of components of the artificial intelligence computing application 614. To illustrate, as previously described with respect to FIG. 4, the risk aggregation system 102 utilizes a mapping of data objects linked to the artificial intelligence computing application 614 to determine various components of the artificial intelligence computing application 614. The risk aggregation system 102 combines risk scores associated with the corresponding data objects to generate the interactive aggregated risk indicator 600.

Additionally, in some aspects, the risk aggregation system 102 compares the interactive aggregated risk indicator 600 to a threshold risk level 602 to determine whether one or more modifications should be made to one or more components of the artificial intelligence computing application 614. To illustrate, the risk aggregation system 102 can determine that the interactive aggregated risk indicator 600 does not meet (e.g., exceeds) the threshold risk level 602 (e.g., indicating a low risk level for the artificial intelligence computing application 614). The risk aggregation system 102 can thus determine that the artificial intelligence computing application 614 passes a risk check and provides a passing notification 604 for display at a client device.

Alternatively, in response to determining that the interactive aggregated risk indicator 600 exceeds the threshold risk level 602, the risk aggregation system 102 can determine that one or more components of the artificial intelligence computing application 614 should be modified. In particular, the risk aggregation system 102 can utilize component-specific information associated with the components of the artificial intelligence computing application 614 to determine one or more components that are causing the interactive aggregated risk indicator 600 to exceed the threshold risk level 602. For example, the risk aggregation system 102 can determine risk scores 606 of the individual components of the artificial intelligence computing application 614 and select a highest risk score 608 indicating a component of the artificial intelligence computing application 614 that is high risk. In additional aspects, the risk aggregation system 102 can determine a plurality of risk scores that exceed a threshold risk value, each of which corresponds to a separate component of the artificial intelligence computing application 614.

To modify the one or more components, in some aspects, the risk aggregation system 102 communicates with a client application 610 of the client device to provide a risk notification 612 indicating that the interactive aggregated risk indicator 600 exceeds the threshold risk level 602. Accordingly, the risk aggregation system 102 can provide the risk notification 612 to indicate that the artificial intelligence computing application 614 does not meet one or more digital data requirements of a system requirements framework. Additionally, the risk aggregation system 102 can provide additional information with the risk notification 612 including, but not limited to, risk information for individual components, such as one or more components that do not meet component-specific threshold risk levels. Furthermore, the risk aggregation system 102 can provide one or more recommendations and/or tools for modifying the component(s) of the artificial intelligence computing application 614.

In some aspects, the risk aggregation system 102 utilizes an automated data process 618 to apply one or more modifications of the artificial intelligence computing application 614 based on the risk scores 606, such as via an integration with a digital data repository or an application or service executed on the third-party computing system 108 of FIG. 1. For instance, the risk aggregation system 102 can determine a component with the highest risk score 608 and determine one or more changes to make to the component to change the risk score for the component (e.g., by changing the risk score for a data object representing the component). To illustrate, the risk aggregation system 102 or the third-party computing system 108 can utilize the automated data process 618 that causes, by generating computer processing instructions, one or more computing devices to perform data processes to redact or delete information in a component (e.g., in a dataset). In another example, the risk aggregation system 102 or the third-party computing system 108 can utilize the automated data process 618 (e.g., via generated instructions) to retrain a machine-learning model with a high risk score based on the performance of the machine-learning model.

As illustrated in FIG. 6, the risk aggregation system 102 and/or the third-party computing system 108 can utilize automated processes and/or manual processes (e.g., via the risk notification 612) to apply modifications to the artificial intelligence computing application 614. Accordingly, the risk aggregation system 102 and/or the third-party computing system 108 can generate (or cause to be generated) a modified component 616 of the artificial intelligence computing application 614. To illustrate, the risk aggregation system 102 and/or the third-party computing system 108 can modify a machine-learning model, a dataset, and/or a machine-learning project to correct one or more errors or other causes of a high risk level in the artificial intelligence computing application 614. In one or more aspects, the risk aggregation system 102 can implement modifications to the component(s) of the artificial intelligence computing application 614 by calling native capabilities of an external system, such as the third-party computing system 108 or another device associated with the third-party computing system 108.

In some aspects, in response to a component of the artificial intelligence computing application 614 being modified, the risk aggregation system 102 can update risk information for the artificial intelligence computing application 614. For instance, as illustrated in FIG. 6, the risk aggregation system 102 can generate an updated risk score 620 for the modified component 616 in response to determining that the original component has been modified. To illustrate, the risk aggregation system 102 determines that the component was modified in response to detecting a modification to a corresponding data object of the component (e.g., to one or more attribute values).

The risk aggregation system 102 can also generate an updated interactive aggregated risk indicator 622 for the artificial intelligence computing application 614 by combining the risk scores of the components including the updated risk score 620. For example, the risk aggregation system 102 can combine the risk scores (including the updated risk score 620) of the components of the artificial intelligence computing application 614 to generate the updated interactive aggregated risk indicator 622. In response to determining that the updated interactive aggregated risk indicator 622 meets the threshold risk level 602, the risk aggregation system 102 can generate the passing notification 604 for display at the client device. Otherwise, the risk aggregation system 102 can continue identifying components of the artificial intelligence computing application 614 that cause the artificial intelligence computing application 614 to exceed (or otherwise not meet) the threshold risk level 602 and apply further modifications to one or more components.

In some aspects, the risk aggregation system 102 provides tools for managing implementation of machine-learning models in connection with various data processes via graphical user interfaces. Specifically, the risk aggregation system 102 provides tools for managing risks involved in implementing machine-learning models via graphical user interfaces that display details associated with artificial intelligence computing applications involving the machine-learning models, datasets, and/or machine-learning projects. Additionally, the risk aggregation system 102 provides tools for determining and mitigating risks associated with components of an artificial intelligence computing application. FIGS. 7-15 illustrate example graphical user interfaces for managing risks of artificial intelligence computing applications via components of the artificial intelligence computing applications.

FIG. 7 illustrates a graphical user interface of a client device for managing risk assessments for various artificial intelligence computing applications. In particular, the client device can include an administrator device including an administrator application for managing various aspects of an artificial intelligence computing application associated with an entity. In some aspects, the client device displays an assessment list 700 including details for one or more risk assessments administered (or to be administered) in connection with one or more artificial intelligence computing applications. For example, the assessment list 700 can include details indicating progress of a risk assessment (e.g., completed, in progress, not started), whether the artificial intelligence computing applications are approved or denied in response to a risk assessment, a risk level and/or an aggregated risk score for an artificial intelligence computing application, ownership information, deadlines, etc. Thus, the assessment list 700 can consolidate information related to various risks for a particular artificial intelligence computing application and whether any mitigation should be performed to correct for the detected risk.

In some embodiments, as described in more detail below, the client device can display additional details associated with a particular risk assessment in response to a selection of the risk assessment in the assessment list 700. Furthermore, the risk aggregation system 102 can provide tools for initiating new risk assessments. For example, as illustrated in FIG. 7, the client device displays a launch assessment element 702 for launching a new risk assessment in connection with an artificial intelligence computing application.

Figure 8:
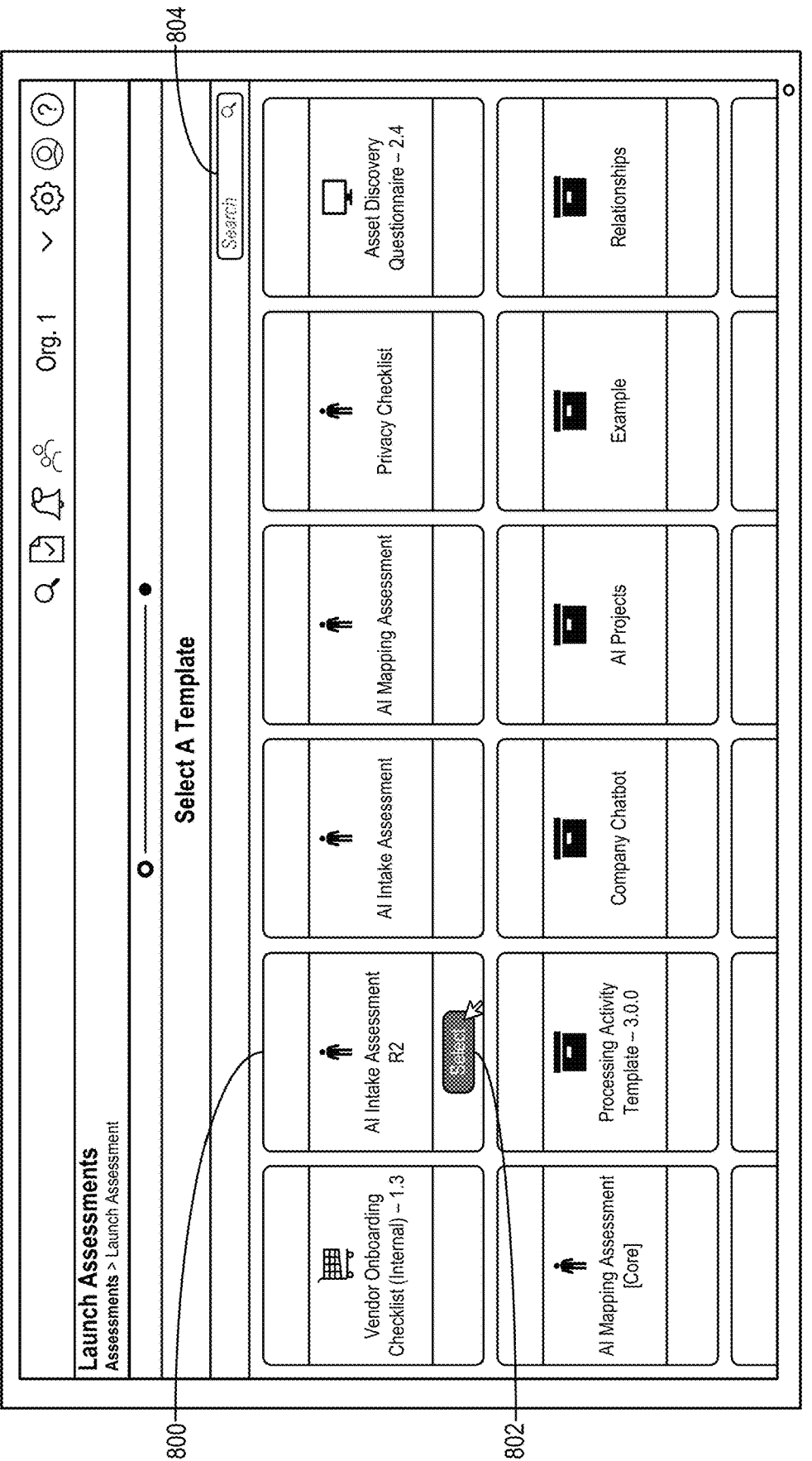
FIG. 8 illustrates an example of a graphical user interface for selecting a risk assessment template for a risk assessment in accordance with some aspects.

In response to detecting a selection of the launch assessment element 702, the client device can display one or more graphical user interfaces for setting up a new risk assessment. For instance, FIG. 8 illustrates a graphical user interface of a client device for selecting a risk assessment template for launching a new risk assessment. Specifically, as illustrated, the client device displays a plurality of available risk assessment templates associated with various risk topics. For example, the risk assessment templates can be associated (e.g., generated based on) specific system requirements frameworks with specific digital data requirements. To illustrate, the client device displays a risk assessment template 800 associated with an artificial intelligence computing application related to artificial intelligence intake, which can be covered by one or more system requirements frameworks. The client device can detect a selection of the risk assessment template 800 via a selection element 802.

In some aspects, the risk aggregation system 102 provides tools for searching for specific risk assessment templates. To illustrate, the client device displays a search field 804 to enter terms to identify a particular risk assessment template, category of risk assessment templates, or other identifying aspects of risk assessment templates. Furthermore, the risk aggregation system 102 can also provide tools for generating new risk assessment templates, such as in connection with a particular artificial intelligence computing application. For example, the client device can display options for generating new risk assessment templates by generating questions and requests or otherwise customizing a risk assessment template based on various possible risks associated with one or more artificial intelligence computing applications.

In response to a selection of the risk assessment template 800 via the selection element 802, the risk aggregation system 102 can initiate a risk assessment. FIG. 9 illustrates a graphical user interface of a client device for initiating a risk assessment in connection with one or more artificial intelligence computing applications. For example, the client device displays an initial assessment interface for providing specific details associated with the risk assessment. To illustrate, the initial assessment interface provides a name field 900 for entering a name of the risk assessment and an organization field 902 for entering an organization or entity associated with the risk assessment. In some aspects, the initial assessment interface also includes options for establishing whether the risk assessment applies to a particular machine-learning project or artificial intelligence computing application, respondents, approvers, etc.

Figure 10:
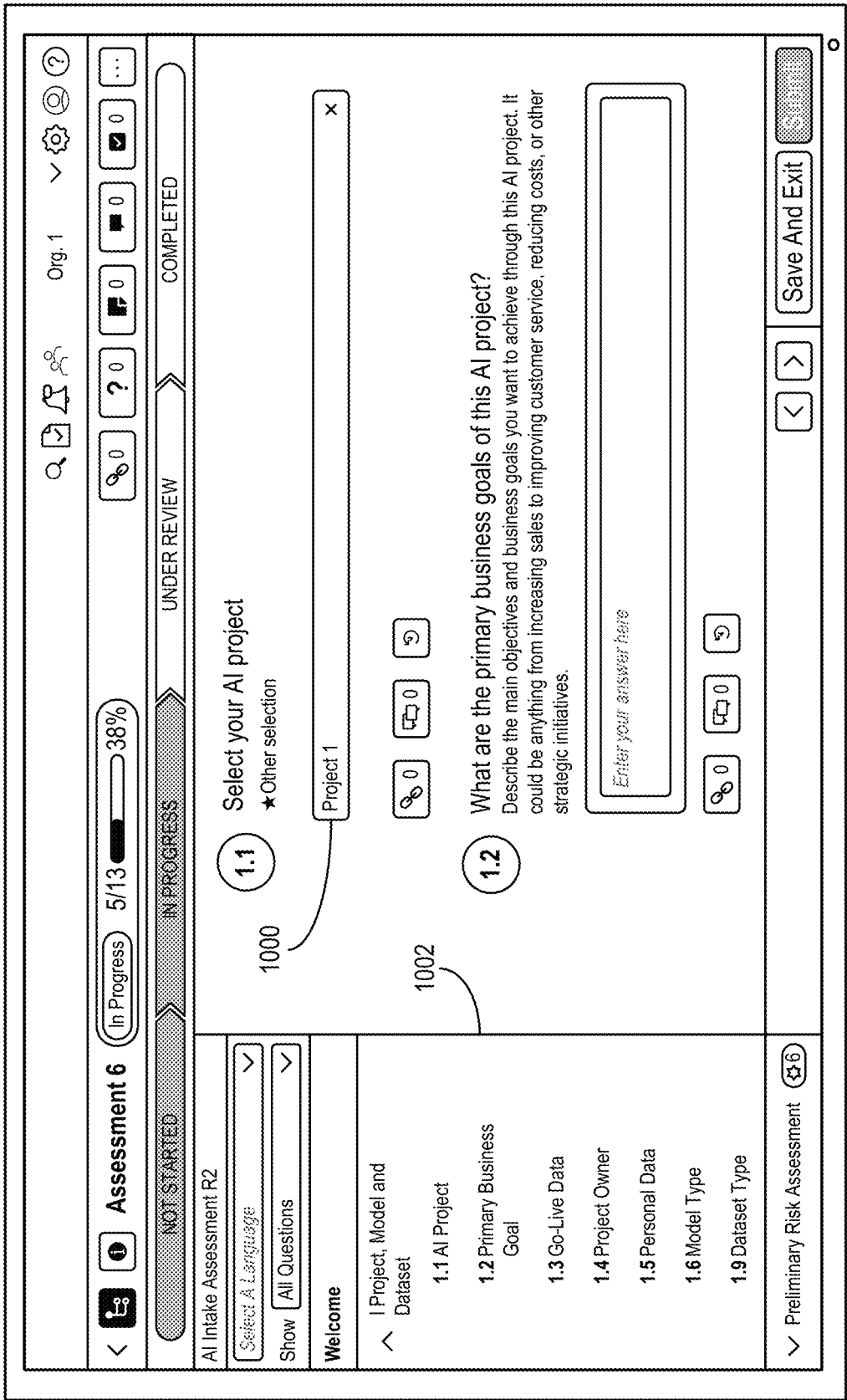
FIG. 10 illustrates an example of a graphical user interface for identifying details associated with a machine-learning project in a risk assessment for an artificial intelligence computing application in accordance with some aspects.
Figure 11:
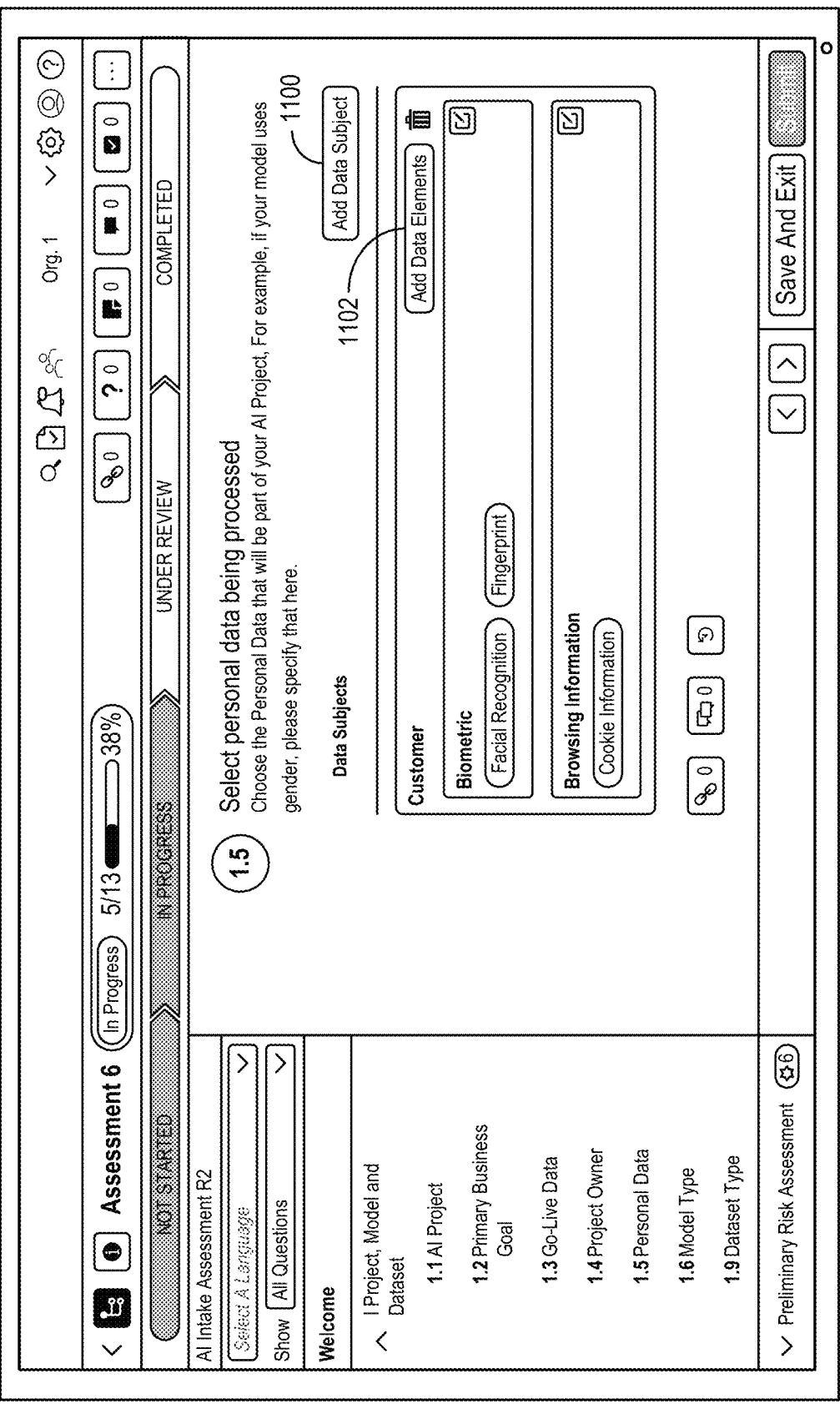
FIG. 11 illustrates an example of a graphical user interface for indicating specific data types accessed by one or more machine-learning models in a risk assessment for an artificial intelligence computing application in accordance with some aspects.
Figure 12:
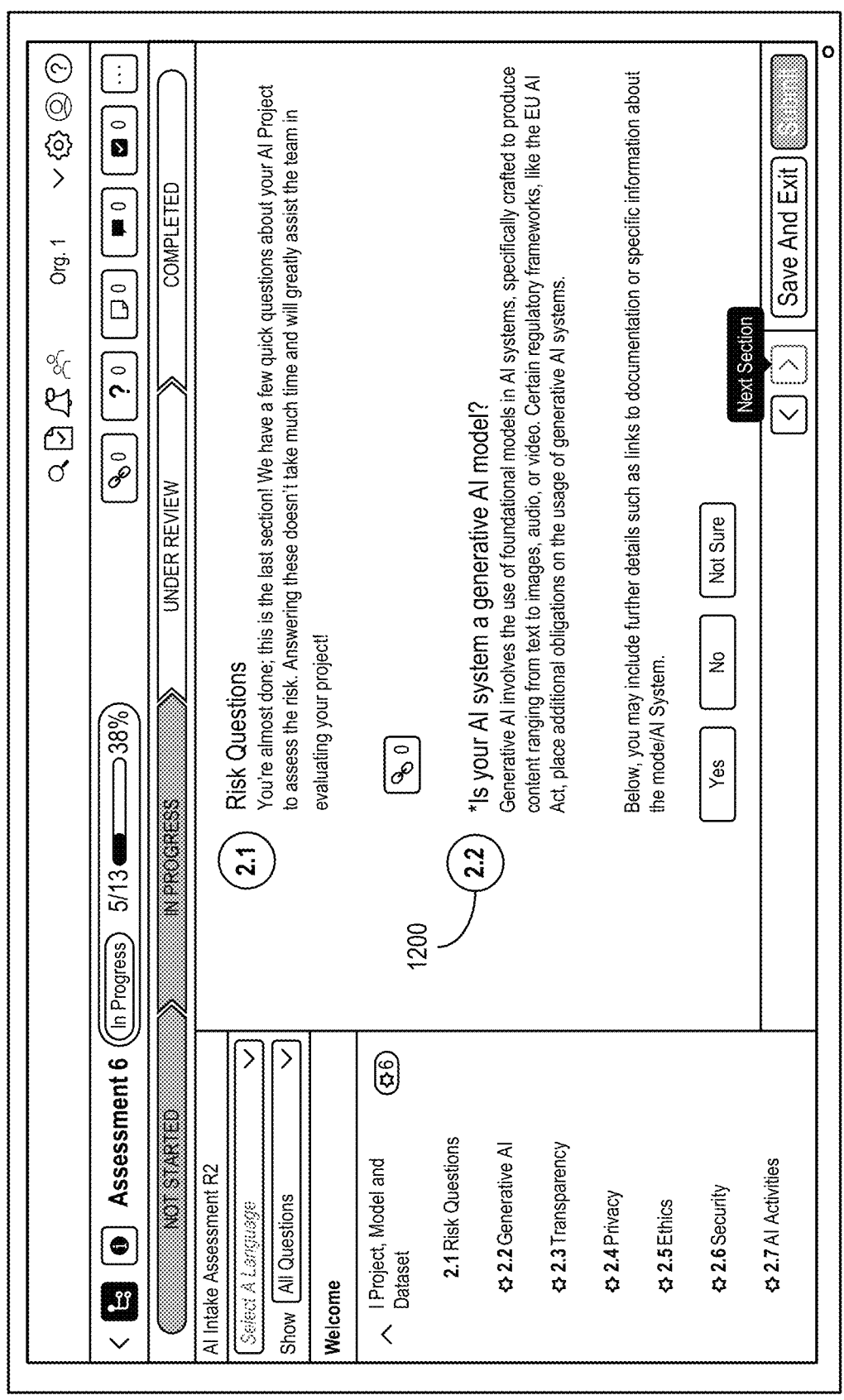
FIG. 12 illustrates an example of a graphical user interface for indicating various risks associated with utilizing one or more machine-learning models in a risk assessment for an artificial intelligence computing application in accordance with some aspects.

Additionally, in response to determining that a risk assessment has been initiated (e.g., via the initial assessment interface), the risk aggregation system 102 can provide one or more additional interfaces to administer the risk assessment. FIGS. 10-12 illustrate various graphical user interfaces of client devices for displaying different portions of a risk assessment. For example, FIG. 10 illustrates a graphical user interface of a client device for displaying various questions or requests in connection with a particular machine-learning project. To illustrate, the client device displays a project selection option 1000 to select or enter a particular machine-learning project associated with the risk assessment. The client device can also display various interactive questions associated with determining various risks connected to the machine-learning project.

Additionally, as illustrated in FIG. 10, the client device can display a navigation menu 1002 associated with the risk assessment. In particular, the navigation menu 1002 can include sections of the risk assessment related to various topics in the risk assessment. For example, as shown, the navigation menu 1002 displays topics corresponding to questions about projects, machine-learning models, datasets, users accessing the components of an artificial intelligence computing application, and/or other questions associated with implementing machine-learning models in an artificial intelligence computing application. The client device can navigate to a particular portion of the risk assessment in response to an interaction with a corresponding portion of the navigation menu 1002.

FIG. 11 illustrates a graphical user interface of a client device displaying additional questions of a risk assessment. In particular, the client device displays questions related to personal data accessed or processed in connection with an artificial intelligence computing application. For example, the risk assessment can include options to add information indicating specific data subjects and/or data elements processed utilizing one or more machine-learning models in the artificial intelligence computing application. To illustrate, the client device displays a subject option 1100 for a respondent to indicate specific data subjects impacted by the artificial intelligence computing application. Additionally, the client device can display an element option 1102 for a respondent to indicate specific data elements processed by the artificial intelligence computing application, such as personally identifiable information (e.g., biometric data), device information (e.g., cookie data), or other specific data types.

FIG. 12 illustrates a graphical user interface of a client device displaying additional risk-related questions of a risk assessment. Specifically, as illustrated, the risk aggregation system 102 can administer a risk assessment by asking more specific questions about machine-learning model implementation in an artificial intelligence computing application in connection with one or more system requirements frameworks. For example, the client device can display questions related to whether the machine-learning models utilized in the artificial intelligence computing application are generative (e.g., question 1200 in FIG. 12), questions related to transparency of the machine-learning models, privacy/ethical/security questions in connection with various system requirements frameworks (or other standards or laws), and/or additional activities involving the machine-learning models. Accordingly, the risk aggregation system 102 can administer a risk assessment to determine various details of a computing system involved in an artificial intelligence computing application, as well as details about the specific machine-learning models, datasets, or projects involved in the artificial intelligence computing application.

In response to administering a risk assessment, the risk aggregation system 102 determines risks associated with an artificial intelligence computing application. In particular, as previously mentioned, the risk aggregation system 102 can utilize assessment data from the risk assessment to generate risk scores for data objects representing components of the artificial intelligence computing application, such as machine-learning models, datasets, and/or machine-learning projects involved in the artificial intelligence computing application. Additionally, the risk aggregation system 102 can generate an aggregated risk score and/or an interactive aggregated risk indicator for the artificial intelligence computing application based on risk scores of the components.

FIG. 13 illustrates an updated assessment list 1300 (e.g., relative to the assessment list 700 of FIG. 7) including details from the new risk assessment. For example, as illustrated, the client device displays an entry 1302 for the new risk assessment based on the assessment data obtained in connection with administering the new risk assessment. As shown, the risk aggregation system 102 generates an aggregated risk score 1304 by combining risk scores of the components of the corresponding artificial intelligence computing application. Additionally, the risk aggregation system 102 generates an interactive aggregated risk indicator 1306 based on the aggregated risk score 1304, such as by comparing the aggregated risk score 1304 to one or more threshold risk levels. As illustrated in FIG. 13, the interactive aggregated risk indicator 1306 indicates that the artificial intelligence computing application has a high risk level.

In some aspects, an interactive aggregated risk indicator includes an interactive graphical user interface element representing a risk level of an artificial intelligence computing application. Accordingly, in response to an interaction with the interactive aggregated risk indicator via a client device, the client device can display additional details of the assessment data from the risk assessment (e.g., implementation details of an artificial intelligence computing application). In some instances, the client device displays the additional details of the assessment data from the risk assessment in response to a selection of the risk assessment from the updated assessment list 1300.

Figure 14:
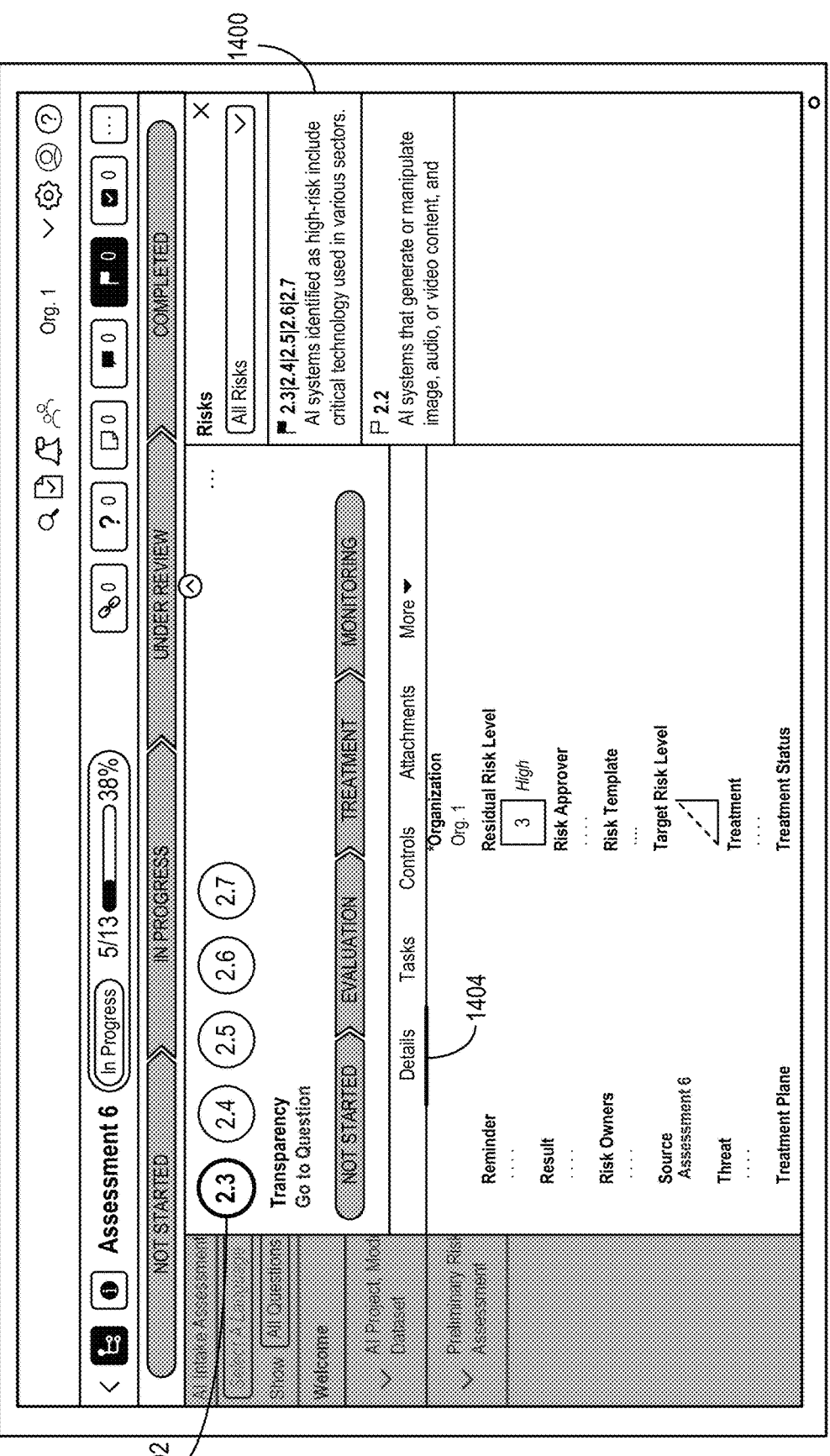
FIG. 14 illustrates an example of a graphical user interface for providing details and risk scores associated with components of an artificial intelligence computing application in accordance with some aspects.

FIG. 14 illustrates a graphical user interface of a client device for providing details and risk scores associated with components of an artificial intelligence computing application. For instance, the client device can obtain assessment data for a risk assessment from the risk aggregation system 102 to display within the graphical user interface. To illustrate, in response to a selection of an interactive aggregated risk indicator for an artificial intelligence computing application, the client device can display an interface including the assessment data from the corresponding risk assessment.

Specifically, as illustrated in FIG. 14, the client device displays an interface including a summary of risks and other assessment data in connection with a risk assessment for an artificial intelligence computing application. For example, the client device displays a risk summary 1400 including a brief summary of risks of the artificial intelligence computing application by accessing the details of the artificial intelligence computing application from one or more data objects linked to the artificial intelligence computing application. To illustrate, the risk summary 1400 can include indications of specific risk scores of different components of the artificial intelligence computing application that the risk aggregation system 102 generated in response to a risk assessment. The risk summary 1400 can also include an aggregated risk indicator for the artificial intelligence computing application based on the combination of risk scores of the separate components, along with an automatically generated summary of the risks for the artificial intelligence computing application (e.g., "AI systems identified as high-risk include critical technology used in various sectors").

In response to a selection of the risk summary 1400 for the artificial intelligence computing application, the client device can display details of individual components of the artificial intelligence computing application with interactive elements for viewing various details of the artificial intelligence computing application. For example, the client device can display details for a first component in response to a selection of a first risk score 1402 (e.g., an interactive element indicating a first risk score) within the graphical user interface by accessing the component details from a data object of the corresponding component. To illustrate, the client device can display a component summary via a plurality of tabs with different data associated with the first component, such as a details tab 1404, a tasks tab, a controls tab, an attachments tab, etc. The client device can detect a selection of an additional risk score (e.g., a second interactive element for a second risk score) in the graphical user interface and display the details of the corresponding component by accessing the component details from a data object of the corresponding component. The risk aggregation system 102 can thus provide tools for viewing risks and other details associated with implementation of machine-learning in an artificial intelligence computing application.

Figure 15:
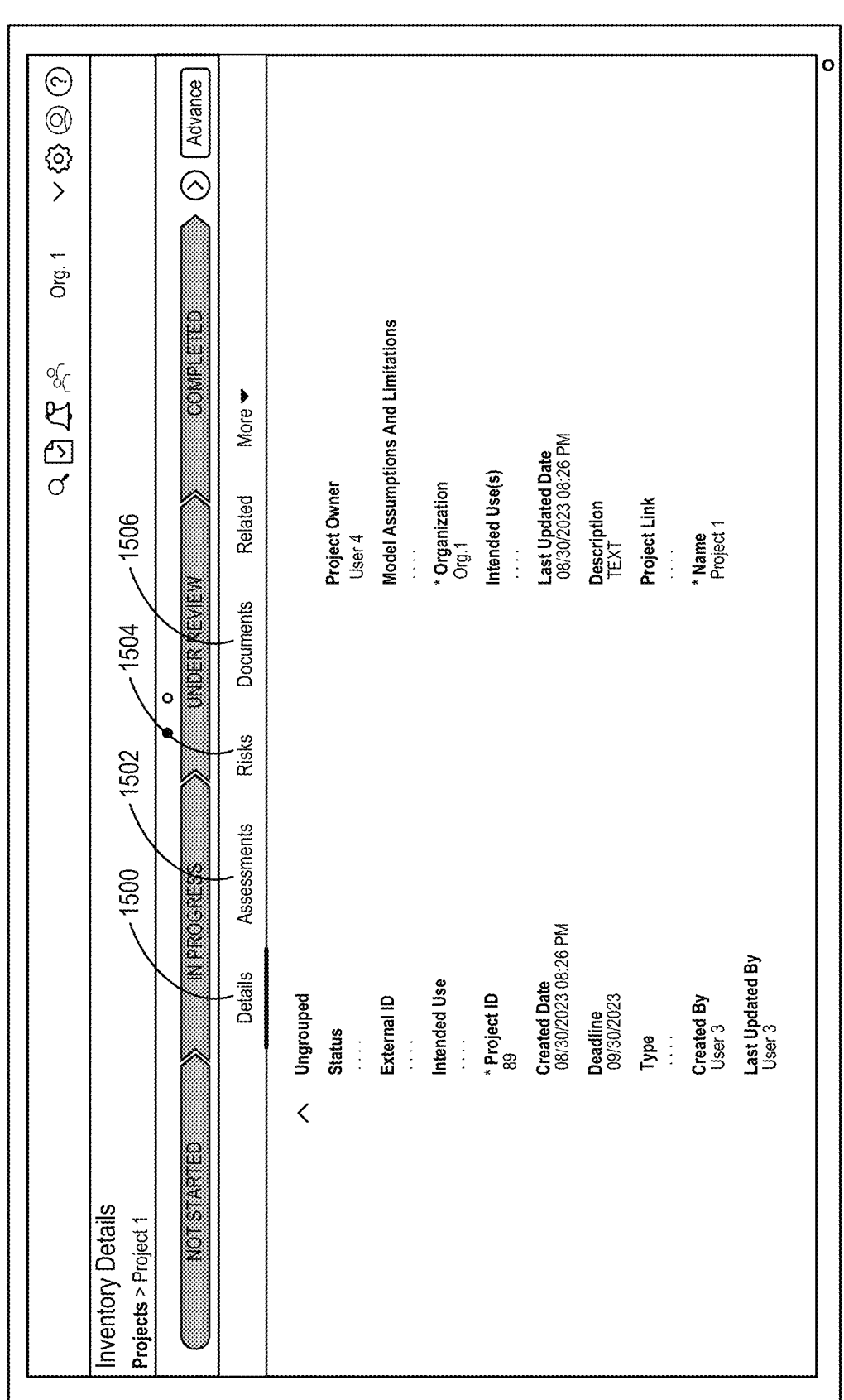
FIG. 15 illustrates an example of a graphical user interface for providing implementation details associated with an artificial intelligence computing application in accordance with some aspects.

In some aspects, the risk aggregation system 102 provides tools for mitigating risks associated with an artificial intelligence computing application. FIG. 15 illustrates a graphical user interface of a client device for managing an artificial intelligence computing application. In particular, FIG. 15 illustrates that the client device displays details associated with a particular implementation of a machine-learning project in an artificial intelligence computing application. For instance, the client device displays a details tab 1500 including various implementation details (e.g., creation date, owner, description, etc.), an assessments tab 1502 including risk assessments for the artificial intelligence computing application, a risks tab 1504 indicating specific risks identified via the risk assessments, and a documents tab 1506 including documentation for the artificial intelligence computing application.

In connection with managing the artificial intelligence computing application and viewing risks associated with the artificial intelligence computing application, the risk aggregation system 102 can provide tools for mitigating the risks. For example, the client device can display specific components causing a risk level of the artificial intelligence computing application to exceed a specific risk threshold. Additionally, the client device can provide tools for navigating to a location in a data storage device associated with a component (e.g., a storage location of a machine-learning model or a dataset). The client device can also provide tools for executing certain data processes to mitigate the risks, such as by modifying a dataset, redacting/deleting certain data types, implementing certain security controls, changing a machine-learning model used in an artificial intelligence computing application, retraining a machine-learning model, or other mitigating processes in a computing environment. As previously mentioned, in some aspects, the risk aggregation system 102 automatically implements one or more data processes to mitigate one or more detected risks in connection with one or more artificial intelligence computing applications.

Turning now to FIG. 16, this figure shows a flowchart of a process 1600 of determining risk indicators of artificial intelligence computing applications by aggregating risk scores for components of the artificial intelligence comput-ing applications. While FIG. 16 illustrates acts according to one embodiment, alternative aspects may omit, add to, reorder, and/or modify any of the acts shown in FIG. 16. The acts of FIG. 16 can be performed as part of a method. Alternatively, a non-transitory computer readable medium can comprise instructions, that when executed by one or more processors, cause a computing device to perform the acts of FIG. 16. In still further aspects, a system (e.g., one or more system described in FIGS. 1 and 17) can perform the acts of FIG. 16.

As shown, the process 1600 includes an act 1602 of determining data objects representing components of an artificial intelligence computing application. In some aspects, act 1602 is implemented using one or more examples described above with respect to FIG. 4. The process 1600 includes an act 1604 of determining mappings between the data objects. In some aspects, act 1604 is implemented using one or more examples described above with respect to FIG. 4. The process 1600 also includes an act 1606 of generating risk scores for the components from the data objects based on one or more risk assessments. In some aspects, act 1606 is implemented using one or more examples described above with respect to FIGS. 3, 5, and 14. Additionally, the process 1600 includes an act 1608 of generating an interactive aggregated risk indicator for display by combining the risk scores of the components. In some aspects, act 1608 is implemented using one or more examples described above with respect to FIGS. 2, 3, 6, 7, 13, and 14.

In some aspects, act 1602 of the process 1600 includes determining a plurality of data objects representing components of an artificial intelligence computing application comprising one or more machine-learning models, one or more datasets, and one or more data analysis projects involving the one or more machine-learning models for the artificial intelligence computing application. In some aspects, act 1604 of the process 1600 includes determining mappings between the plurality of data objects according to relationships of the components of the artificial intelligence computing application. Furthermore, in some aspects, act 1606 of the process 1600 includes generating risk scores for the plurality of data objects representing the components of the artificial intelligence computing application based on one or more risk assessments administered according to on one or more risk assessment templates that correspond to a system requirements framework, the system requirements framework comprising one or more requirements for storing and handling one or more data types in a digital environment by the components of the artificial intelligence computing application. In some aspects, act 1608 of the process 1600 includes generating, for display via a graphical user interface of a computing device, an interactive aggregated risk indicator indicating risk contributions of the components of the artificial intelligence computing application to the artificial intelligence computing application in relation to the system requirements framework by combining the risk scores of the plurality of data objects representing the components of the artificial intelligence computing application according to the mappings between the plurality of data objects.

In some aspects, act 1602 involves accessing a digital data repository via an integration of a data extraction software application. For example, act 1602 can involve extracting, via the integration of the data extraction software application with the digital data repository, a plurality of digital entities corresponding to the one or more machine-learning models, the one or more datasets, and the one or more data analysis projects. Act 1602 can also involve generating the plurality of data objects comprising attribute values representing the components of the artificial intelligence computing application according to the plurality of digital entities.

In some aspects, act 1602 involves determining, via the integration of the data extraction software application with the digital data repository, a plurality of digital entities corresponding to the one or more machine-learning models, the one or more datasets, and the one or more machine-learning projects. Act 1602 can involve generating the plurality of data objects comprising attribute values according to data extracted from the plurality of digital entities. Act 1602 can also involve generating a mapping linking the plurality of data objects to the artificial intelligence computing application according to relationships between the components of the artificial intelligence computing application. This can involve one or more examples described above with respect to the risk aggregation system 102 of FIG. 4.

Additionally, act 1604 can involve generating, for the artificial intelligence computing application, a mapping linking a data object of the plurality of data objects to the artificial intelligence computing application in response to determining a relationship between a digital entity corresponding to a component of the artificial intelligence computing application via the integration of the data extraction software application with the digital data repository. This can involve one or more examples described above with respect to the risk aggregation system 102 of FIG. 4.

In some aspects, act 1606 involves generating, by accessing a first set of attribute values in a first data object, a first risk score corresponding to a first machine-learning model utilized in connection with the artificial intelligence computing application. Act 1606 can involve generating, by accessing a second set of attribute values in a second data object, a second risk score corresponding to a second machine-learning model utilized in connection with the artificial intelligence computing application. This can involve one or more examples described above with respect to the risk aggregation system 102 of FIG. 3.

In some aspects, act 1606 involves generating, for a first data object, a first risk score corresponding to a first dataset accessed by the one or more machine-learning models associated with the artificial intelligence computing application. Act 1606 can also involve generating, for a second data object, a second risk score corresponding to a second dataset accessed by the one or more machine-learning models associated with the artificial intelligence computing application. This can involve one or more examples described above with respect to the risk aggregation system 102 of FIG. 3.

In some aspects, act 1606 involves generating, for a first data object in response to the one or more risk assessments, a first risk score corresponding to a machine-learning model utilized in connection with the artificial intelligence computing application. Act 1606 can involve generating, for a second data object in response to the one or more risk assessments, a second risk score corresponding to a dataset accessed by the machine-learning model in connection with the artificial intelligence computing application. Act 1606 can also involve generating, for a third data object in response to the one or more risk assessments, a third risk score corresponding to a data analysis project including a data process to test the machine-learning model utilized in connection with the artificial intelligence computing application and the dataset accessed by the machine-learning model in connection with the artificial intelligence computing application. This can involve one or more examples described above with respect to the risk aggregation system 102 of FIGS. 3 and 5.

In some aspects, act 1608 involves determining, based on the mappings, that the plurality of data objects are linked to the artificial intelligence computing application. Act 1608 can also involve generating the interactive aggregated risk indicator by extracting the risk scores from the plurality of data objects linked to the artificial intelligence computing application. This can involve one or more examples described above with respect to the risk aggregation system 102 of FIGS. 3 and 5.

Act 1608 an involve aggregating, according to the mappings, the risk scores of the plurality of data objects representing the components of the artificial intelligence computing application by extracting the risk scores from the plurality of data objects. Act 1608 can further involve generating the interactive aggregated risk indicator by comparing an aggregation of the risk scores to one or more threshold risk values. This can involve one or more examples described above with respect to the risk aggregation system 102 of FIGS. 3 and 5.

In some aspects, the process 1600 includes providing, for display via the graphical user interface, a plurality of interactive elements corresponding to the risk scores of the plurality of data objects representing the components of the artificial intelligence computing application in response to a selection of the interactive aggregated risk indicator. The process 1600 can also include responsive to a selection of an interactive element corresponding to a risk score of a data object representing a corresponding component of the artificial intelligence computing application, providing a summary of component details extracted from the data object representing the corresponding component. This can involve one or more examples described above with respect to the risk aggregation system 102 of FIG. 14.

The process 1600 can include responsive to a selection of the interactive aggregated risk indicator: providing, for display via the graphical user interface, a first interactive element corresponding to a first risk score of a first data object representing a first component of the artificial intelligence computing application; and providing, for display via the graphical user interface, a second interactive element corresponding to a second risk score of a second data object representing a second component of the artificial intelligence computing application. Additionally, the process 1600 can include responsive to a selection of the first interactive element, providing, for display via the graphical user interface, a summary of component details extracted from the first data object representing the first component. This can involve one or more examples described above with respect to FIG. 14.

In some aspects, the process 1600 includes determining that a component of the artificial intelligence computing application has been modified in response to detecting a modification to a data object representing the component of the artificial intelligence computing application. The process 1600 can also include generating an updated risk score for the data object representing the component of the artificial intelligence computing application in response to determining that the component has been modified. This can involve one or more examples described above with respect to the risk aggregation system 102 of FIG. 6.

The process 1600 can also include determining that a component of the artificial intelligence computing application has been modified in response to detecting a modification to a data object of the component of the artificial intelligence computing application. The process 1600 can further include generating an updated risk score for the component of the artificial intelligence computing application in response to determining that the component has been modified. The process 1600 can also include generating an updated interactive aggregated risk indicator for the artificial intelligence computing application based on the updated risk score. This can involve one or more examples described above with respect to the risk aggregation system 102 of FIG. 6.

The process 1600 can include determining that the interactive aggregated risk indicator exceeds a threshold risk level for the artificial intelligence computing application. The process 1600 can also include determining, in response to the interactive aggregated risk indicator exceeding the threshold risk level, a component of the artificial intelligence computing application corresponding to a highest risk score of the risk scores of the plurality of data objects representing the components of the artificial intelligence computing application. The process 1600 can further include causing, by generating computer processing instructions, one or more computing devices to perform one or more data processes to modify the component of the artificial intelligence computing application corresponding to the highest risk score. This can involve one or more examples described above with respect to the risk aggregation system 102 of FIG. 6.

In some aspects, act 1604 involves generating a risk assessment from a risk assessment template comprising a plurality of customizable options corresponding to a plurality of data categories. The process 1600 can include extracting, via an integration of a data extraction software application with a digital data repository, data from a plurality of digital entities for a set of selected options corresponding to the plurality of data categories. The process 1600 can also include completing the risk assessment with the data extracted from the plurality of digital entities. This can involve one or more examples described above with respect to the risk aggregation system 102 of FIG. 5.

The process 1600 can also include administering the one or more risk assessments to one or more computing devices associated with the one or more digital data repositories. The process 1600 can further include writing data received from the one or more computing devices in connection with the one or more risk assessments to the attribute values of the plurality of data objects. Additionally, the process 1600 can include generating the risk scores for the plurality of data objects representing the components of the artificial intelligence computing application based on the data written to the attribute values of the plurality of data objects in connection with the one or more risk assessments. This can involve one or more examples described above with respect to the risk aggregation system 102 of FIG. 5.

The process 1600 can also include determining that a particular risk score of a data object representing a component of the artificial intelligence computing application does not meet a threshold risk value. The process 1600 can further include responsive to the particular risk score not meeting the threshold risk value, causing one or more computing devices to perform one or more data processes to modify the component of the artificial intelligence computing application corresponding to the particular risk score. This can involve one or more examples described above with respect to the risk aggregation system 102 of FIG. 6.

In some aspects, the process 1600 includes detecting, via an integration of a data extraction software application with one or more digital data repositories, a change to an attribute value of a data object representing a component of the artificial intelligence computing application. The process 1600 can include generating an updated risk score for the data object representing the component of the artificial intelligence computing application based on the change to the attribute value of the data object. Additionally, the process 1600 can include generating, for display via the graphical user interface, an updated interactive aggregated risk indicator based on the updated risk score. This can involve one or more examples described above with respect to the risk aggregation system 102 of FIG. 6.

In some aspects, act 1602 involves determining a plurality of data objects representing components of an artificial intelligence computing application, the components comprising one or more machine-learning models, one or more datasets, and one or more machine-learning projects involving the one or more machine-learning models and the one or more datasets. Act 1604 can involve generating risk scores for the plurality of data objects representing the components of the artificial intelligence computing application based on one or more risk assessments administered according to on one or more risk assessment templates that correspond to a system requirements framework, the system requirements framework comprising one or more requirements for storing and handling one or more data types in a digital environment by the components of the artificial intelligence computing application. Act 1606 can also involve generating, for display via a graphical user interface of a computing device, an interactive aggregated risk indicator indicating risk contributions of the components of the artificial intelligence computing application to the artificial intelligence computing application in relation to the system requirements framework by combining the risk scores of the plurality of data objects representing the components of the artificial intelligence computing application according to mappings between the plurality of data objects indicating relationships of the components of the artificial intelligence computing application. Additionally, the process 1600 can also include causing modification of one or more components of the artificial intelligence computing application in response to the interactive aggregated risk indicator exceeding a threshold risk level.

In some aspects, the process also includes providing, for display via the graphical user interface in response to a selection of the interactive aggregated risk indicator, the risk scores of the plurality of data objects representing the components of the artificial intelligence computing application with details associated with the components of the artificial intelligence computing application according to the one or more risk assessments. This can involve one or more examples described above with respect to the client device of FIG. 14.

Aspects described in the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
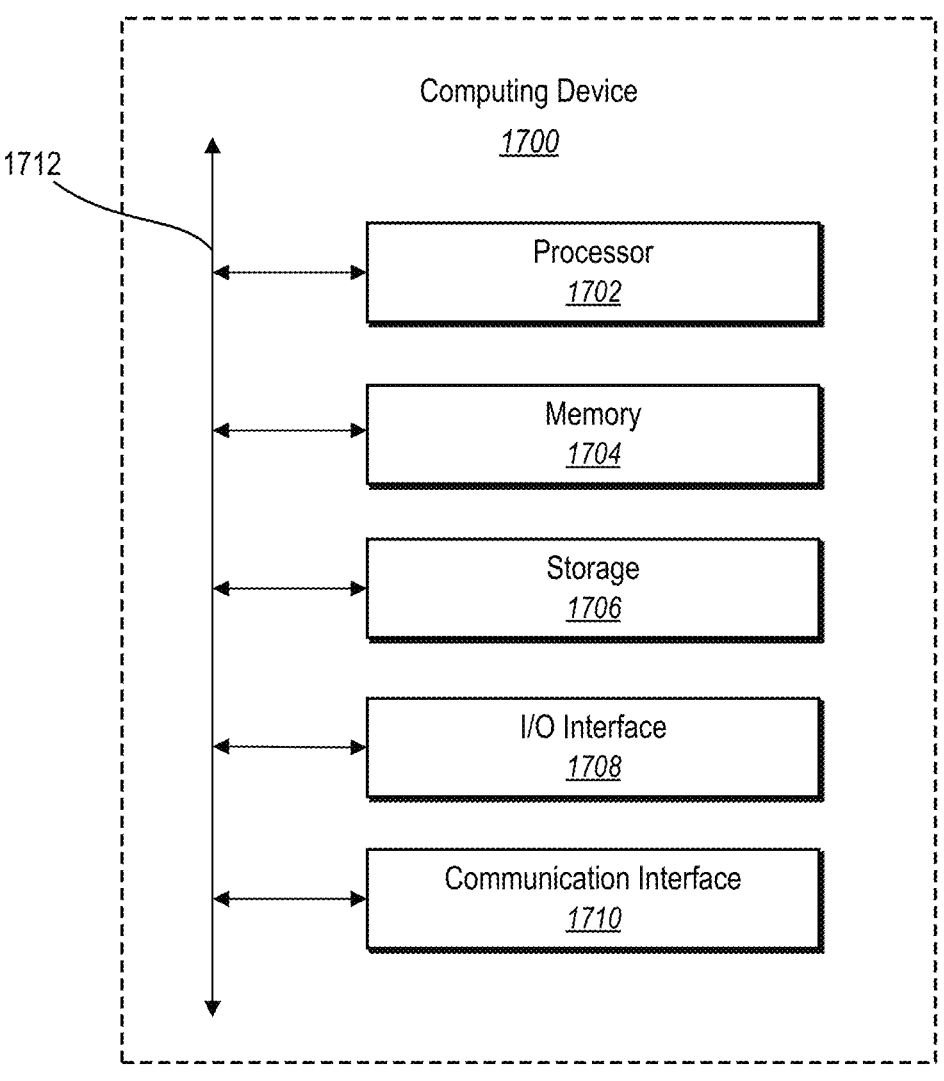
FIG. 17 illustrates an example of a computing device in accordance with some aspects.

FIG. 17 illustrates a block diagram of exemplary computing device 1700 that may be configured to perform one or more of the processes described above. One will appreciate that one or more computing devices such as the computing device 1700 may implement the system(s) of FIG. 1. As shown by FIG. 17, the computing device 1700 can comprise a processor 1702, a memory 1704, a storage device 1706, an I/O interface 1708, and a communication interface 1710, which may be communicatively coupled by way of a communication infrastructure 1712. In certain aspects, the computing device 1700 can include fewer or more components than those shown in FIG. 17. Components of the computing device 1700 shown in FIG. 17 will now be described in additional detail.

In some aspects, the processor 1702 includes hardware for executing instructions, such as those making up a computer program. As an example, and not by way of limitation, to execute instructions for dynamically modifying workflows, the processor 1702 may retrieve (or fetch) the instructions from an internal register, an internal cache, the memory 1704, or the storage device 1706 and decode and execute them. The memory 1704 may be a volatile or non-volatile memory used for storing data, metadata, and programs for execution by the processor(s). The storage device 1706 includes storage, such as a hard disk, flash disk drive, or other digital storage device, for storing data or instructions for performing the methods described herein.

The I/O interface 1708 allows a user to provide input to, receive output from, and otherwise transfer data to and receive data from computing device 1700. The I/O interface 1708 may include a mouse, a keypad or a keyboard, a touch screen, a camera, an optical scanner, network interface, modem, other known I/O devices or a combination of such I/O interfaces. The I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1708 is configured to provide graphical data to a display for presentation to a user. The graphical data may be representative of one or more graphical user interfaces and/or any other graphical content as may serve a particular implementation.

The communication interface 1710 can include hardware, software, or both. In any event, the communication interface 1710 can provide one or more interfaces for communication (such as, for example, packet-based communication) between the computing device 1700 and one or more other computing devices or networks. As an example, and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1710 may facilitate communications with various types of wired or wireless networks. The communication interface 1710 may also facilitate communications using various communication protocols. The communication infrastructure 1712 may also include hardware, software, or both that couples components of the computing device 1700 to each other. For example, the communication interface 1710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
determining, by computing hardware, a plurality of data objects representing components of an artificial intelligence computing application comprising one or more machine-learning models, one or more datasets, and one or more data analysis projects involving the one or more machine-learning models for the artificial intelligence computing application;
determining, by the computing hardware, mappings between the plurality of data objects according to relationships of the components of the artificial intelligence computing application;
generating, by the computing hardware, risk scores for the plurality of data objects representing the components of the artificial intelligence computing application based on one or more risk assessments administered according to on one or more risk assessment templates that correspond to a system requirements framework, the system requirements framework comprising one or more requirements for storing and handling one or more data types in a digital environment by the components of the artificial intelligence computing application; and
generating, by the computing hardware for display via a graphical user interface of a computing device, an interactive aggregated risk indicator indicating risk contributions of the components of the artificial intelligence computing application to the artificial intelligence computing application in relation to the system requirements framework by combining the risk scores of the plurality of data objects representing the components of the artificial intelligence computing application according to the mappings between the plurality of data objects.

2. The computer-implemented method of claim 1, wherein determining the plurality of data objects comprises:
accessing, by the computing hardware, a digital data repository via an integration of a data extraction software application;
extracting, via the integration of the data extraction software application with the digital data repository, a plurality of digital entities corresponding to the one or more machine-learning models, the one or more datasets, and the one or more data analysis projects; and
generating the plurality of data objects comprising attribute values representing the components of the artificial intelligence computing application according to the plurality of digital entities.

3. The computer-implemented method of claim 2, wherein determining the mappings comprises generating, for the artificial intelligence computing application, a mapping linking a data object of the plurality of data objects to the artificial intelligence computing application in response to determining a relationship between a digital entity corresponding to a component of the artificial intelligence computing application via the integration of the data extraction software application with the digital data repository.

4. The computer-implemented method of claim 3, wherein generating the interactive aggregated risk indicator comprises:

determining, based on the mappings, that the plurality of data objects are linked to the artificial intelligence computing application; and generating the interactive aggregated risk indicator by extracting the risk scores from the plurality of data objects linked to the artificial intelligence computing application.

5. The computer-implemented method of claim 1, wherein generating the risk scores comprises:

generating, by accessing a first set of attribute values in a first data object, a first risk score corresponding to a first machine-learning model utilized in connection with the artificial intelligence computing application; and generating, by accessing a second set of attribute values in a second data object, a second risk score corresponding to a second machine-learning model utilized in connection with the artificial intelligence computing application.

6. The computer-implemented method of claim 1, wherein generating the risk scores comprises:

generating, for a first data object, a first risk score corresponding to a first dataset accessed by the one or more machine-learning models associated with the artificial intelligence computing application; and generating, for a second data object, a second risk score corresponding to a second dataset accessed by the one or more machine-learning models associated with the artificial intelligence computing application.

7. The computer-implemented method of claim 1, further comprising:

providing, for display via the graphical user interface, a plurality of interactive elements corresponding to the risk scores of the plurality of data objects representing the components of the artificial intelligence computing application in response to a selection of the interactive aggregated risk indicator; and responsive to a selection of an interactive element corresponding to a risk score of a data object representing a corresponding component of the artificial intelligence computing application, providing a summary of component details extracted from the data object representing the corresponding component.

8. The computer-implemented method of claim 1, further comprising:

determining that a component of the artificial intelligence computing application has been modified in response to detecting a modification to a data object representing the component of the artificial intelligence computing application; and generating an updated risk score for the data object representing the component of the artificial intelligence computing application in response to determining that the component has been modified.

9. The computer-implemented method of claim 1, further comprising:

determining that the interactive aggregated risk indicator exceeds a threshold risk level for the artificial intelligence computing application;

determining, in response to the interactive aggregated risk indicator exceeding the threshold risk level, a component of the artificial intelligence computing application corresponding to a highest risk score of the risk scores of the plurality of data objects representing the components of the artificial intelligence computing application; and causing, by generating computer processing instructions, one or more computing devices to perform one or more data processes to modify the component of the artificial intelligence computing application corresponding to the highest risk score.

10. The computer-implemented method of claim 1, wherein generating the risk scores comprises:

generating a risk assessment from a risk assessment template comprising a plurality of customizable options corresponding to a plurality of data categories;

extracting, via an integration of a data extraction software application with a digital data repository, data from a plurality of digital entities for a set of selected options corresponding to the plurality of data categories; and completing the risk assessment with the data extracted from the plurality of digital entities.

11. A system comprising:

one or more non-transitory computer readable media comprising components of an artificial intelligence computing application, the components comprising one or more machine-learning models, one or more datasets, and one or more machine-learning projects involving the one or more machine-learning models and the one or more datasets; and processing hardware configured to cause the system to:

determine a plurality of data objects representing the components of the artificial intelligence computing application;

generate risk scores for the plurality of data objects representing the components of the artificial intelligence computing application based on one or more risk assessments administered according to on one or more risk assessment templates that correspond to a system requirements framework, the system requirements framework comprising one or more requirements for storing and handling one or more data types in a digital environment by the components of the artificial intelligence computing application;

generate, for display via a graphical user interface of a computing device, an interactive aggregated risk indicator indicating risk contributions of the components of the artificial intelligence computing application to the artificial intelligence computing application in relation to the system requirements framework by combining the risk scores of the plurality of data objects representing the components of the artificial intelligence computing application according to mappings between the plurality of data objects indicating relationships of the components of the artificial intelligence computing application; and cause modification of one or more components of the artificial intelligence computing application in response to the interactive aggregated risk indicator exceeding a threshold risk level.

12. The system of claim 11, wherein the processing hardware is configured to determine the plurality of data objects by:

determining, via an integration of a data extraction software application with a digital data repository, a plurality of digital entities corresponding to the one or more machine-learning models, the one or more datasets, and the one or more machine-learning projects;

generating the plurality of data objects comprising attribute values according to data extracted from the plurality of digital entities; and generating the mappings by linking the plurality of data objects to the artificial intelligence computing application according to the relationships between the components of the artificial intelligence computing application indicated by the plurality of digital entities.

13. The system of claim 12, wherein the processing hardware is configured to generate the interactive aggregated risk indicator by:

aggregating, according to the mappings, the risk scores of the plurality of data objects representing the components of the artificial intelligence computing application by extracting the risk scores from the plurality of data objects; and generating the interactive aggregated risk indicator by comparing an aggregation of the risk scores to one or more threshold risk values.

14. The system of claim 11, wherein the processing hardware is configured to generate the risk scores by:

generating, for a first data object in response to the one or more risk assessments, a first risk score corresponding to a machine-learning model utilized in connection with the artificial intelligence computing application;

generating, for a second data object in response to the one or more risk assessments, a second risk score corresponding to a dataset accessed by the machine-learning model in connection with the artificial intelligence computing application; and generating, for a third data object in response to the one or more risk assessments, a third risk score corresponding to a data analysis project including a data process to test the machine-learning model utilized in connection with the artificial intelligence computing application and the dataset accessed by the machine-learning model in connection with the artificial intelligence computing application.

15. The system of claim 11, wherein the processing hardware is configured to:

responsive to a selection of the interactive aggregated risk indicator:

provide, for display via the graphical user interface, a first interactive element corresponding to a first risk score of a first data object representing a first component of the artificial intelligence computing application; and provide, for display via the graphical user interface, a second interactive element corresponding to a second risk score of a second data object representing a second component of the artificial intelligence computing application; and responsive to a selection of the first interactive element, provide, for display via the graphical user interface, a summary of component details extracted from the first data object representing the first component.

16. The system of claim 11, wherein the processing hardware is configured to:

determine that a component of the artificial intelligence computing application has been modified in response to detecting a modification to a data object representing the component of the artificial intelligence computing application;

generate an updated risk score for the data object representing the component of the artificial intelligence computing application in response to determining that the component has been modified; and generate an updated interactive aggregated risk indicator for the artificial intelligence computing application based on the updated risk score.

17. The system of claim 11, wherein the processing hardware is configured to:

determine that a particular risk score of a data object representing a component of the artificial intelligence computing application does not meet a threshold risk value; and responsive to the particular risk score not meeting the threshold risk value, cause one or more computing devices to perform one or more data processes to modify the component of the artificial intelligence computing application corresponding to the particular risk score.

18. A non-transitory computer readable medium storing instructions that, when executed by computing hardware, cause the computing hardware to:

determine a plurality of data objects representing components of an artificial intelligence computing application comprising a machine-learning model, a dataset, and a data analysis projects involving the machine-learning model for the artificial intelligence computing application;

determine mappings between the plurality of data objects according to relationships of the components of the artificial intelligence computing application;

generate risk scores for the plurality of data objects representing the components of the artificial intelligence computing application based on one or more risk assessments administered according to on one or more risk assessment templates that correspond to a system requirements framework, the system requirements framework comprising one or more requirements for storing and handling one or more data types in a digital environment by the components of the artificial intelligence computing application; and generate, for display via a graphical user interface of a computing device, an interactive aggregated risk indicator indicating risk contributions of the components of the artificial intelligence computing application to the artificial intelligence computing application in relation to the system requirements framework by combining the risk scores of the components of the plurality of data objects representing the artificial intelligence computing application.

19. The non-transitory computer readable medium of claim 18, further comprising instructions that, when executed by the computing hardware, cause the computing hardware to:

administer the one or more risk assessments to one or more computing devices associated with one or more digital data repositories;

write data received from the one or more computing devices in connection with the one or more risk assessments to attribute values of the plurality of data objects; and generate the risk scores for the plurality of data objects representing the components of the artificial intelligence computing application based on the data written to the attribute values of the plurality of data objects in connection with the one or more risk assessments.

20. The non-transitory computer readable medium of claim 18, further comprising instructions that, when executed by the computing hardware, cause the computing hardware to:

detect, via an integration of a data extraction software application with one or more digital data repositories, a change to an attribute value of a data object representing a component of the artificial intelligence computing application;

generate an updated risk score for the data object representing the component of the artificial intelligence computing application based on the change to the attribute value of the data object; and generate, for display via the graphical user interface, an updated interactive aggregated risk indicator based on the updated risk score.

* * * * *